(12) United States Patent
Stover

(10) Patent No.: US 8,251,229 B2
(45) Date of Patent: Aug. 28, 2012

(54) CYLINDRICAL MODULE HANDLER WITH PANELS

(75) Inventor: Jimmy R. Stover, Corpus Christi, TX (US)

(73) Assignee: Stover Equipment Co., Inc., Corpus Christi, TX (US)

( * ) Notice: Subject to any disclaimer, the term of this patent is extended or adjusted under 35 U.S.C. 154(b) by 266 days.

(21) Appl. No.: 12/658,263

(22) Filed: Feb. 12, 2010

(65) Prior Publication Data

US 2010/0146739 A1 Jun. 17, 2010

Related U.S. Application Data

(62) Division of application No. 11/350,314, filed on Feb. 3, 2006.

(51) Int. Cl.
*B07C 5/36* (2006.01)

(52) U.S. Cl. .................. 209/616; 414/412; 414/797.3

(58) Field of Classification Search ............ 414/411, 414/412, 769.4, 797.3, 797.4; 209/552, 616
See application file for complete search history.

(56) References Cited

U.S. PATENT DOCUMENTS

| | | | |
|---|---|---|---|
| 2,989,252 A | 6/1961 | Babb | |
| 3,968,940 A | 7/1976 | Godbersen | |
| 4,057,876 A * | 11/1977 | Sawyer | 19/80 R |
| 4,390,312 A | 6/1983 | Skeem | |
| 4,592,698 A | 6/1986 | Semp | |
| 4,610,596 A | 9/1986 | Bouldin | |
| 4,827,699 A | 5/1989 | Shauman | |
| 4,897,010 A | 1/1990 | Golley | |
| 4,929,141 A | 5/1990 | Keesey | |
| 5,067,870 A | 11/1991 | Staffanson | |
| 5,179,878 A | 1/1993 | Kranefeld | |
| 5,228,628 A | 7/1993 | Temburg | |
| 5,318,399 A | 6/1994 | Marom | |
| 5,371,938 A * | 12/1994 | Martin | 29/564.3 |
| 5,454,683 A | 10/1995 | Marom | |
| 5,771,661 A | 6/1998 | Martin | |
| 6,648,254 B2 * | 11/2003 | Hruska | 241/101.763 |
| 6,848,238 B2 | 2/2005 | Korhonan | |
| 7,165,928 B2 | 1/2007 | Haverdink | |
| 2006/0191241 A1 * | 8/2006 | Deutsch et al. | 53/492 |
| 2007/0181469 A1 | 8/2007 | Stover | |
| 2008/0052876 A1 | 3/2008 | Stover | |
| 2009/0205932 A1 | 8/2009 | Stover | |

* cited by examiner

*Primary Examiner* — Stefanos Karmis
*Assistant Examiner* — Kalyanavenkateshware Kumar
(74) *Attorney, Agent, or Firm* — G. Turner Moller

(57) ABSTRACT

In one embodiment, a system for removing a plastic wrap from a cylindrical module includes a conveyor transporting the cylindrical module toward a disperser with the cylindrical axis of the module parallel to the direction of conveyor movement. In another embodiment, the disperser is a travelling head disperser thereby providing relative movement between the modules and the disperser. The direction of the wrap around the module is determined and the cover is removed during rotation of the module, either by unwrapping the plastic or by slitting the plastic and then rotating the module. The equipment used to handle a cylindrical module is moved out of the path of movement of a conventional rectangular module so an installation can handle both rectangular and wrapped cylindrical modules.

21 Claims, 11 Drawing Sheets

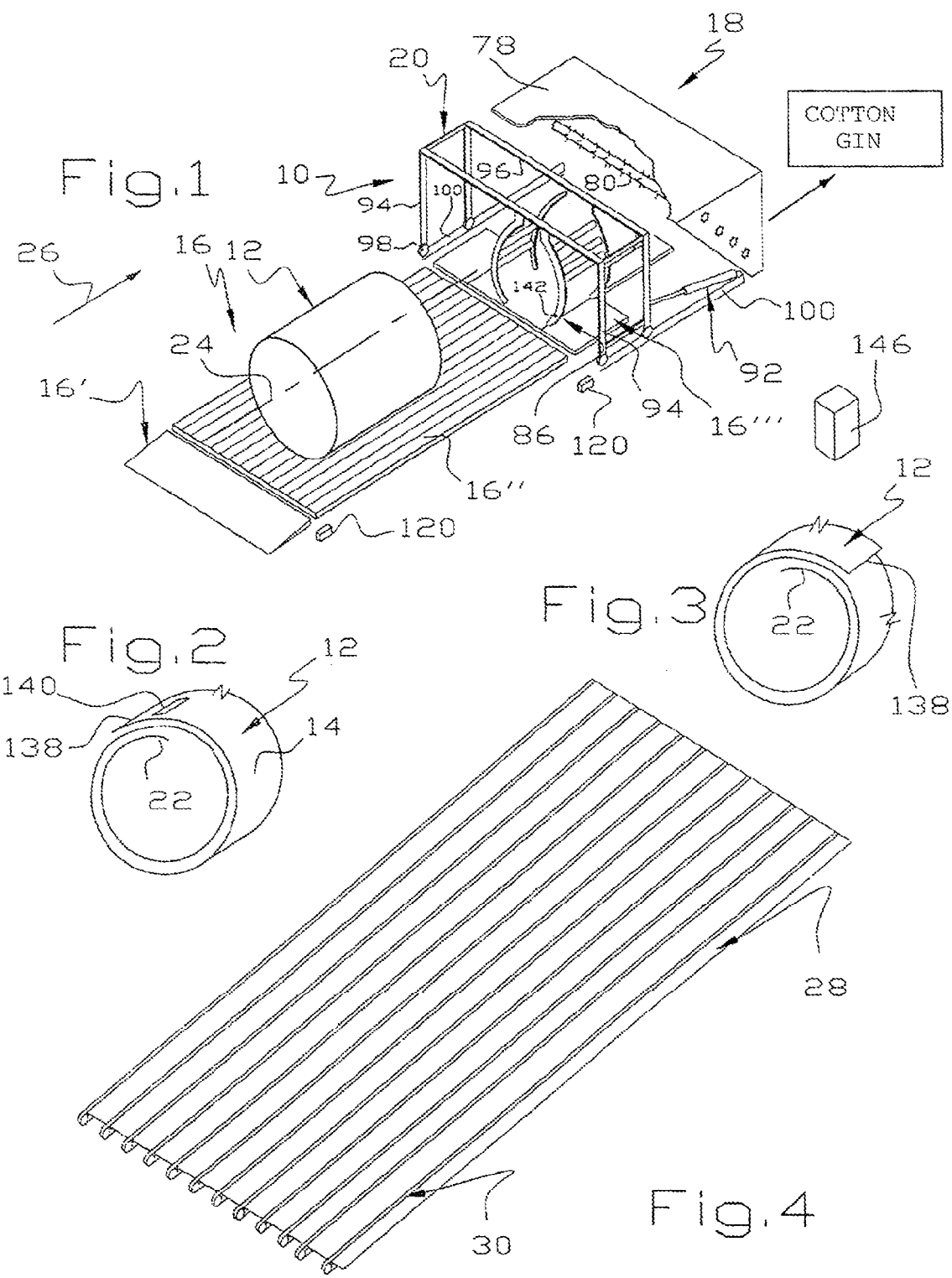

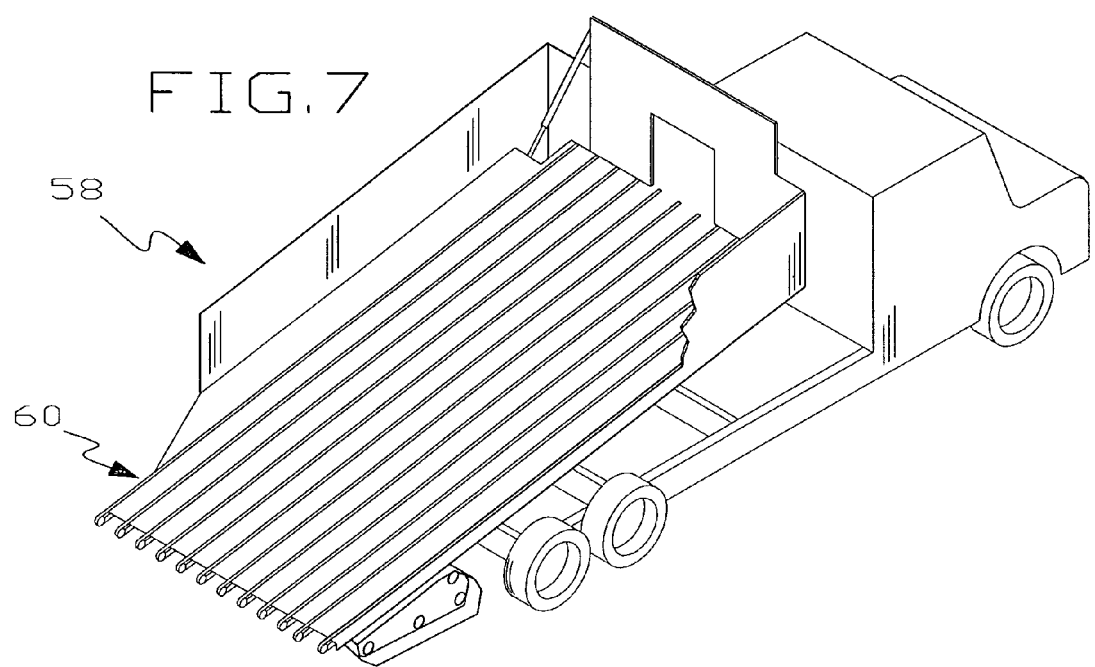
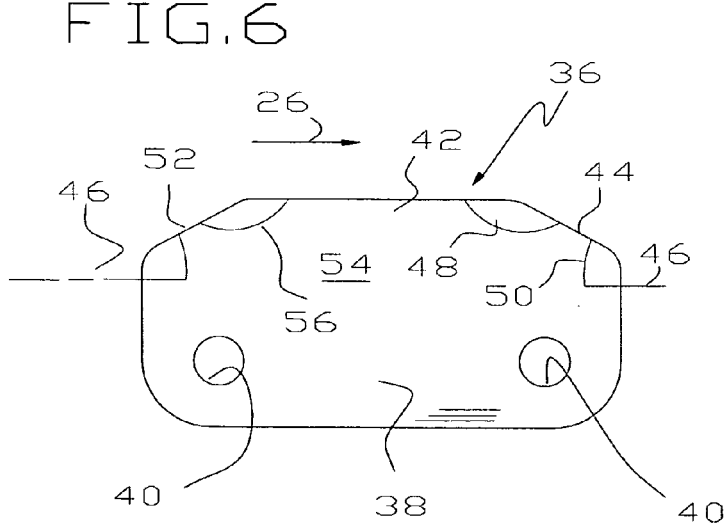 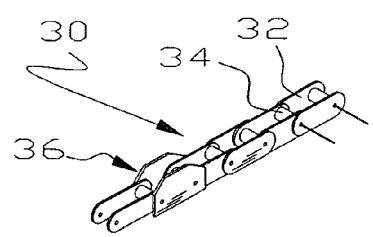

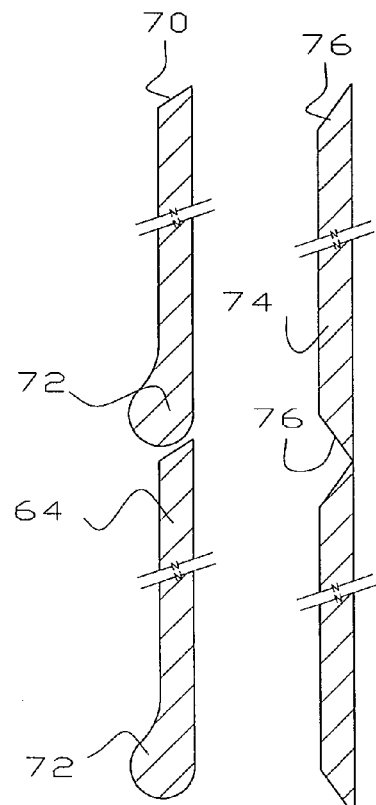
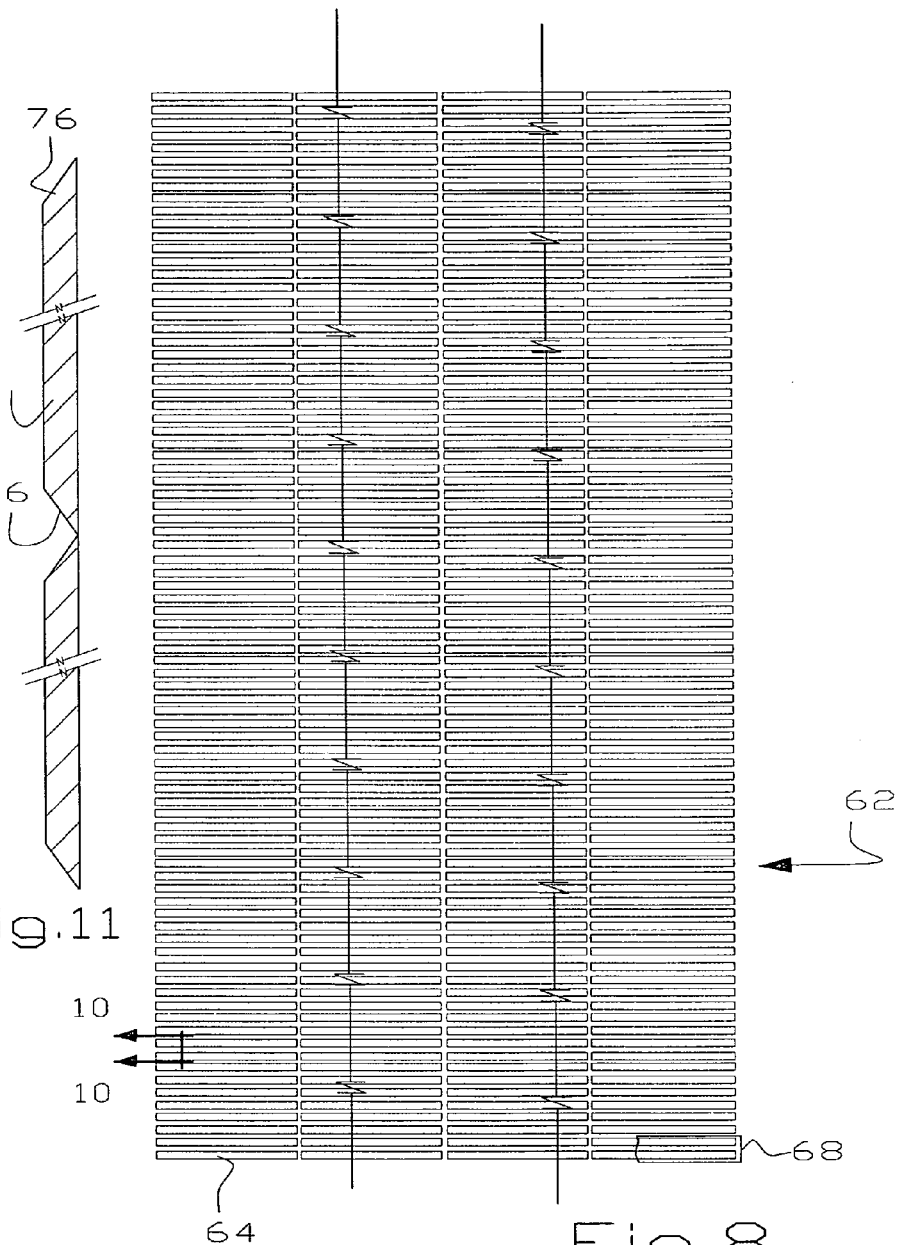
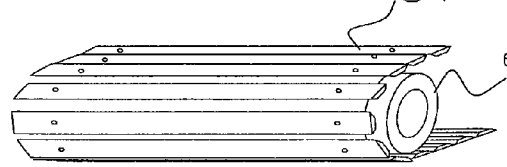

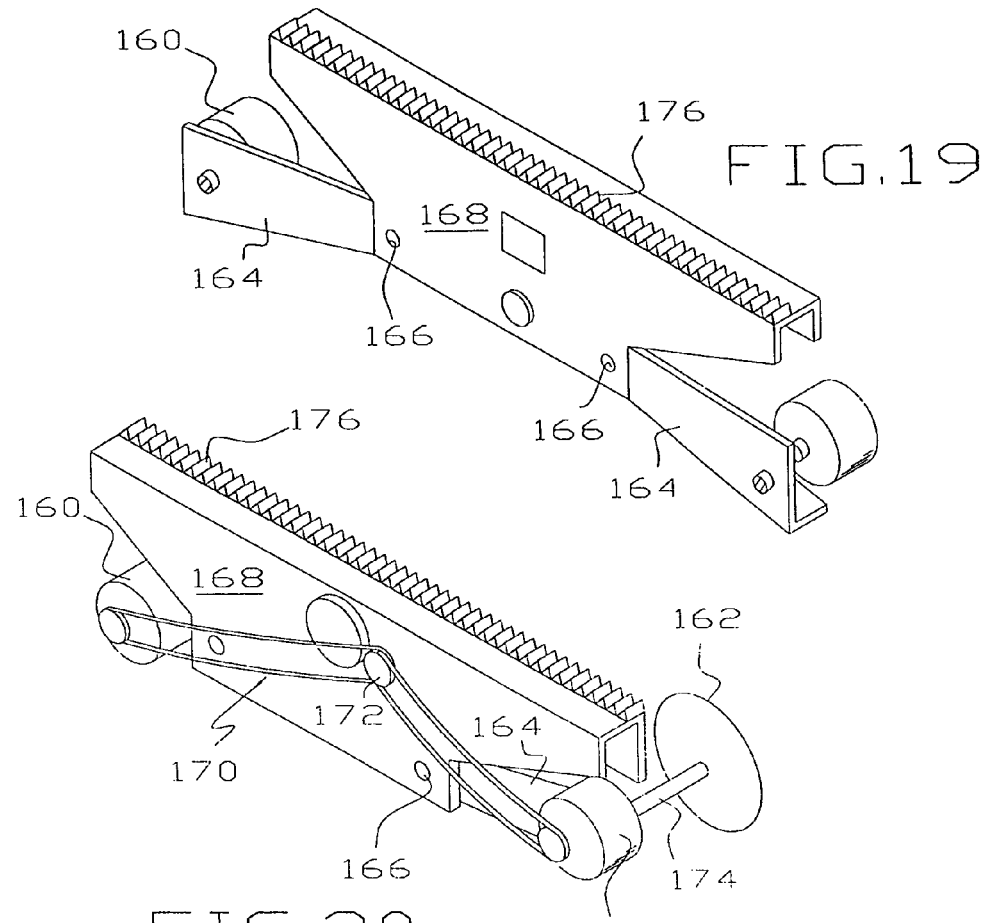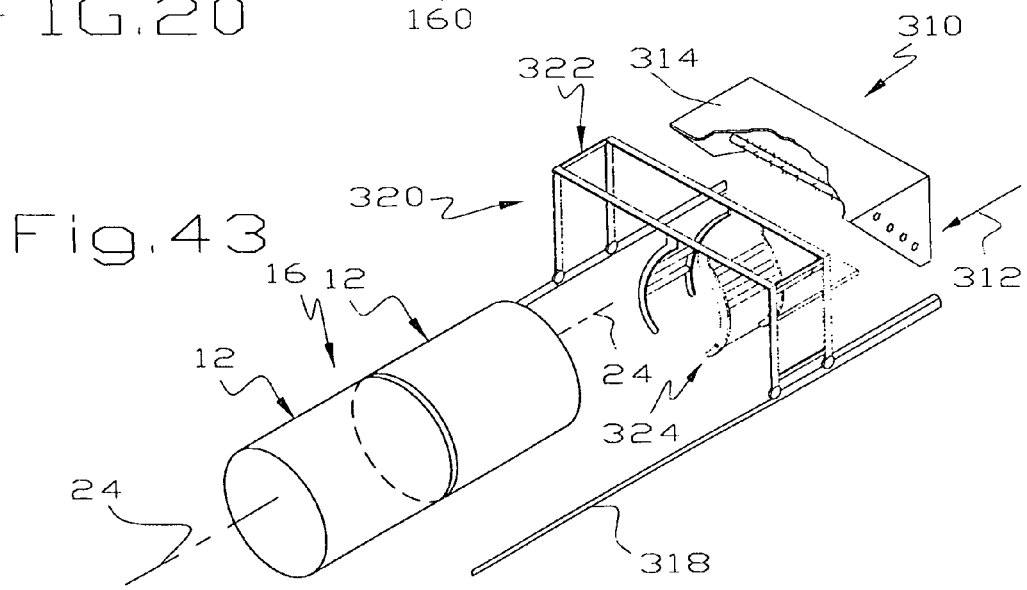

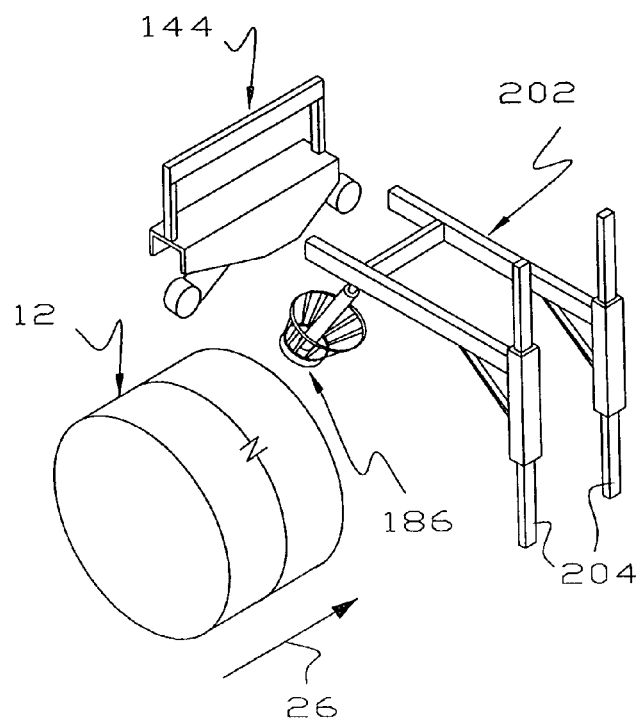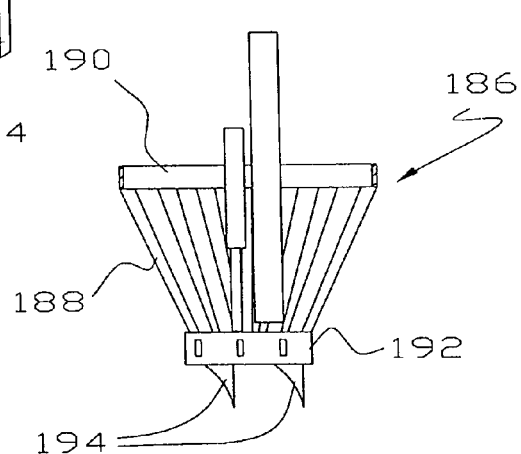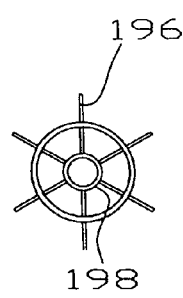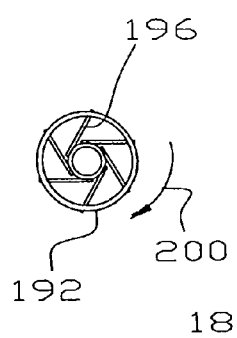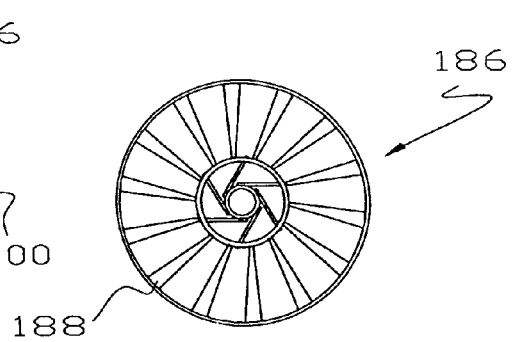

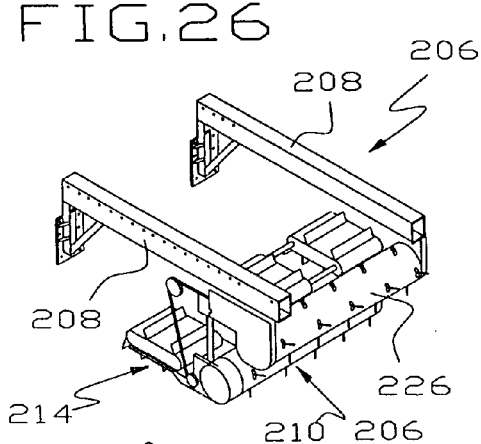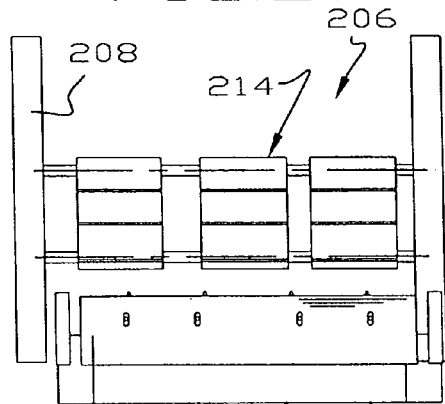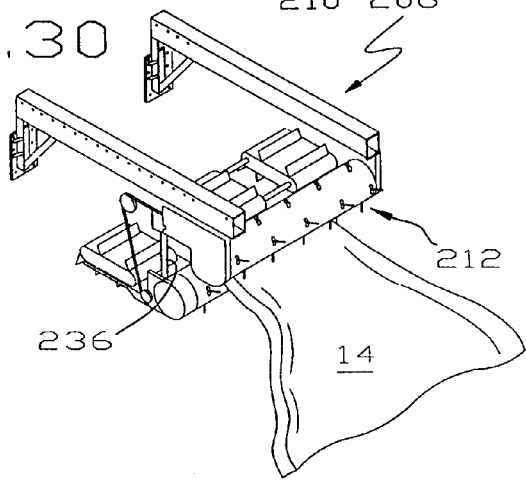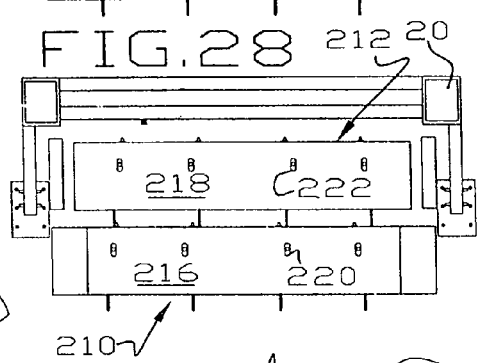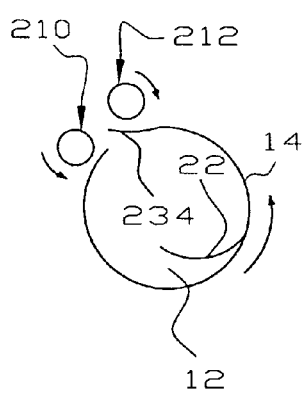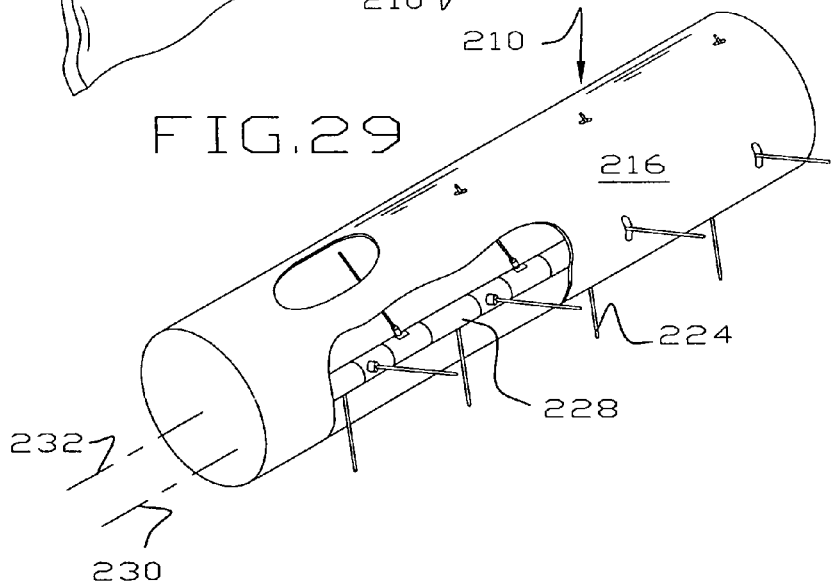

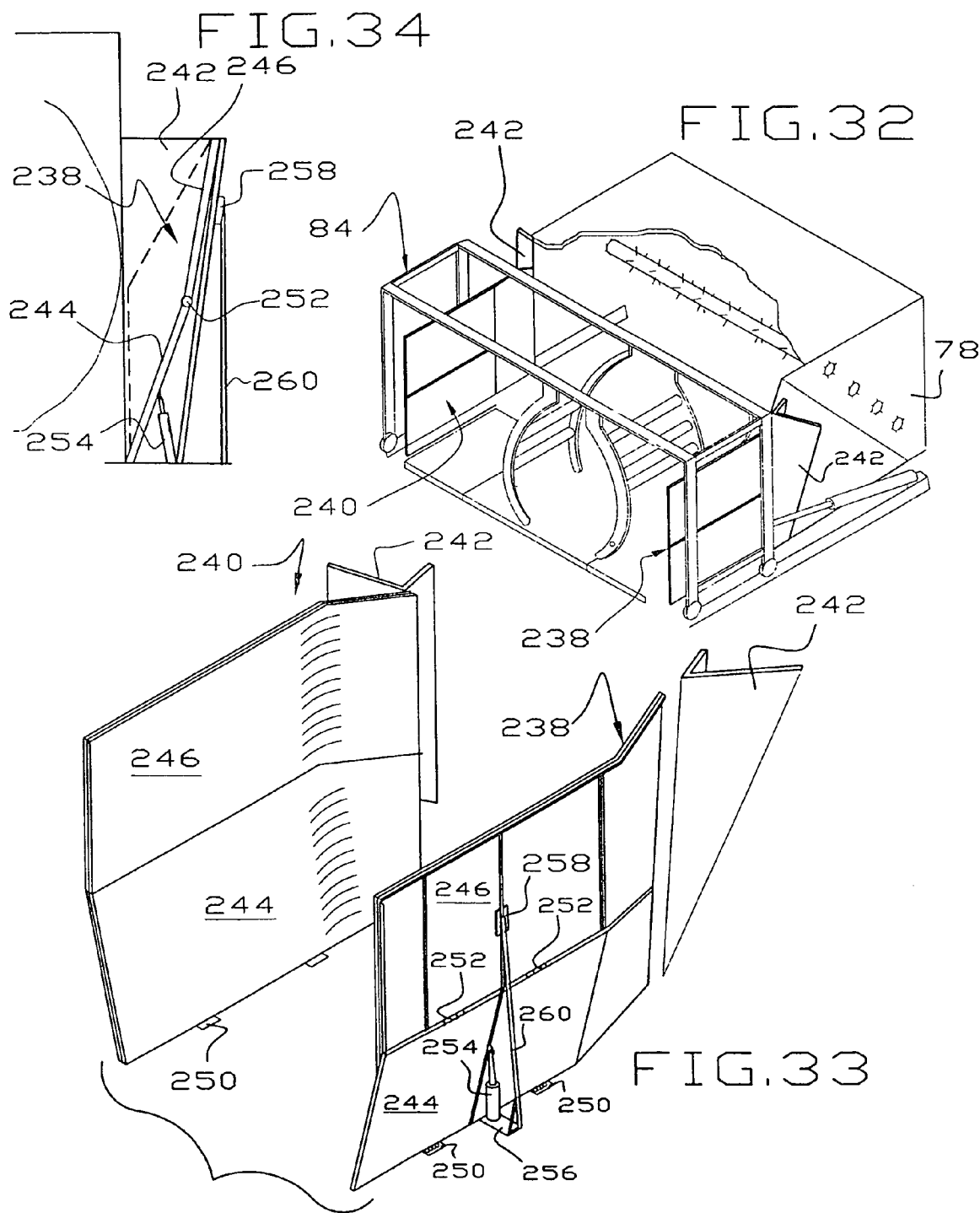

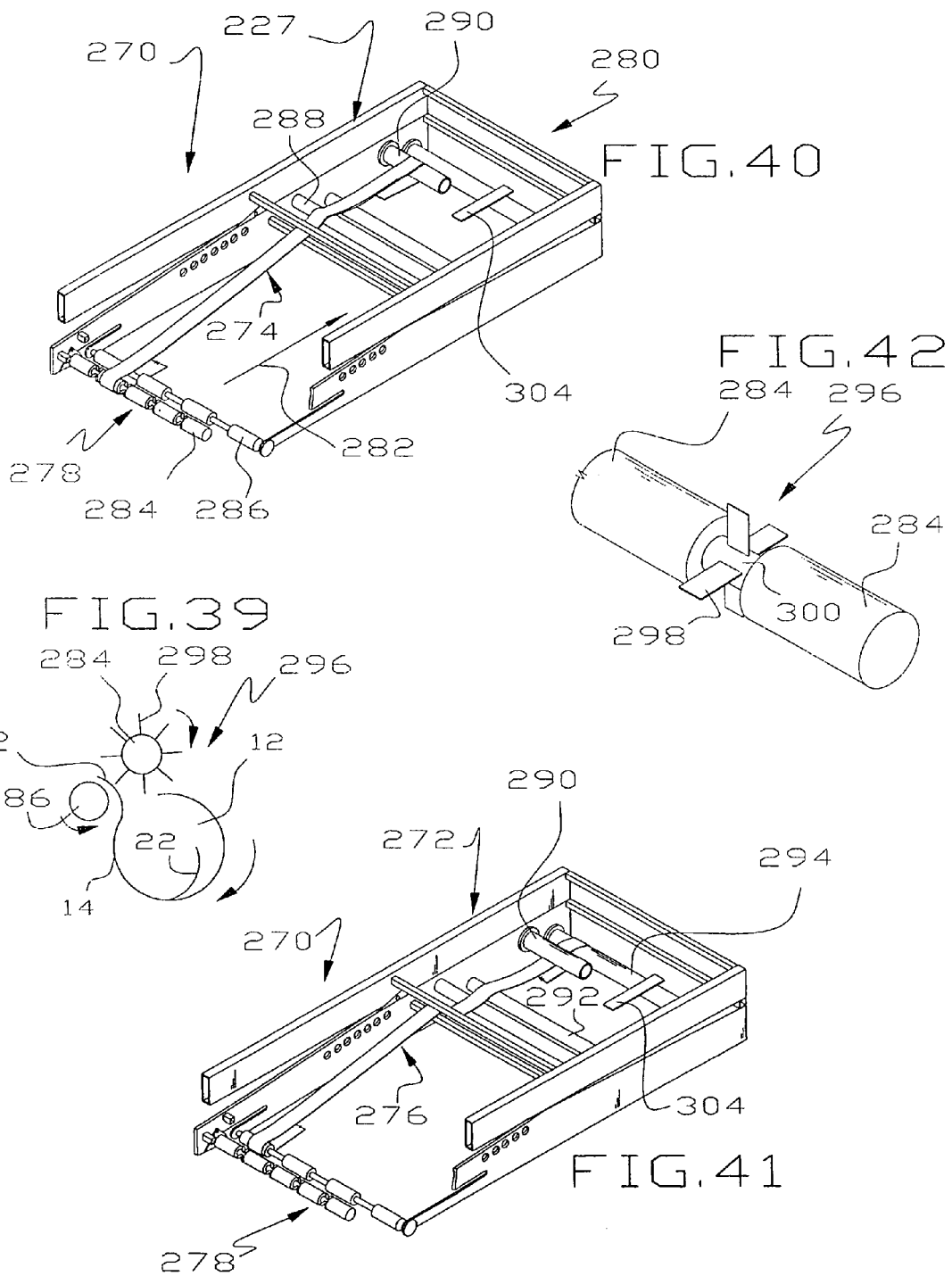

CYLINDRICAL MODULE HANDLER WITH PANELS

This application is a division of application Ser. No. 11/350,314, filed Feb. 3, 2006.

This invention relates to a method and apparatus for removing a wrapping or cover from cylindrical modules of fibrous materials.

BACKGROUND OF THE INVENTION

Although this invention has potential application for handling other cylindrical bales of fibrous materials, it will mainly be described in conjunction with its most imminent and important application, which is the handling of cylindrical cotton modules.

Handling of seed cotton from the time it is picked, or stripped, in the field until it enters a cotton gin has evolved over the years. Fifty years ago, seed cotton was dumped into small trailers and hauled to the gin. This was supplanted by cotton module technology where cotton from a picker/stripper is delivered to a module builder on the edge of the field. A large rectangular cotton module is made by alternately dumping seed cotton into the builder and then packing the cotton. The module is discharged from the module builder onto the ground and the top is covered with a plastic tarpaulin or cover. Later, the module is picked up by a special module retriever truck and hauled to the gin where it is stored, almost always outside, along with a large number of other modules until the gin is ready to handle this particular module. The module is then picked up by the same or similar module truck and hauled to a module feeder. The plastic cover is removed and the module conveyed to a disperser where the module is disintegrated and the cotton fibers are delivered to the gin. Cotton module technology, expensive as it is, is considerably more efficient, all things considered, than hauling loose cotton in cotton trailers. Accordingly, cotton module technology completely replaced cotton trailers and has been the standard of the industry for several decades.

Current cotton module technology has its problems. A major problem is that module builders discharge the packed cotton module onto the ground. Even though the cotton is fairly tightly packed and attempts are made to position the cotton modules on fairly high ground, there is always the potential for water to collect around the base of the module and wick up into the module, damaging a bottom layer of the cotton to an extent where it is not ginned. Six inches or a foot of damaged cotton on the bottom of a module will be seen to be a significant part of a module ten feet high. In addition, the plastic covers on top of the module, which are intended to shed water, are not perfect. The worst thing that can happen is for the cover to have, or develop, a hole where rain enters and damages the seed cotton resulting in the loss of an entire module. Conventional rectangular cotton modules weigh in the range of 18,000 to 26,000 pounds and contain 5,000-9,000 pounds of lint cotton so it is easy to see the extent of potential losses.

Disclosures of interest are found in U.S. Pat. Nos. 3,991,944; 4,057,876; 4,592,698; 4,610,596; 4,929,141; 5,179,878; 5,228,628; 5,318,399; 5,340,040; 5,371,938; 5,454,683; 6,202,950; 6,332,426 and 6,481,653.

SUMMARY OF THE INVENTION

In response to these problems, it has been proposed to make cylindrical cotton modules, often called round modules, which are wrapped in plastic in such a manner that the plastic wrap covers the cylindrical sides of the module and part of the ends so water cannot enter the module to an extent sufficient to damage a significant part of the cotton. The current generation of cylindrical modules is about one quarter the weight of conventional rectangular modules. The problem addressed by this invention is to completely remove the plastic wrap in an efficient, expeditious, reliable and inexpensive manner in a way that does not disrupt or interfere with normal ginning operations. It is apparent that other fibrous agricultural products may be similarly wrapped, such as corn stover, kenaf, hemp and the like although the problems in unwrapping such modules are very different for reasons which will become apparent.

In one embodiment of this invention, cylindrical cotton modules that are wrapped with a cover are aligned and abutted on a conveyor with the cylindrical axis of the modules parallel to the direction of movement of the modules toward a disperser. A device picks up each module in turn and rotates the module to remove the cover either by unwrapping it, or in the alternative, slitting and then rotating the module to remove the cover. Because the conveyor continues to move in order to feed cotton into the disperser, the rotating device also travels at the same rate so that when plastic removal is complete, the unwrapped module is repositioned on the conveyor in juxtaposed relation to an upstream module so there is normally no substantial gap between adjacent modules as they enter the disperser. After the unwrapped module is placed back on the conveyor, the unwrapping device moves back toward the inlet end of the conveyor to pick up the next adjacent cylindrical module.

In one embodiment, a system provides for handling conventional rectangular cotton modules and for handling wrapped cylindrical modules. This is accomplished by positioning the cylindrical module handling equipment on a frame or gantry and moving the equipment laterally or upwardly out of the path of movement of the rectangular cotton modules. Thus, in this embodiment, the conveyor and disperser are used to selectively handle rectangular and cylindrical cotton modules.

There is a need for many alternatives and many components to produce an effective system for removing a cover from seed cotton modules.

It is an object of this invention to provide a method and apparatus for removing covers from cylindrical agricultural modules.

Another object of this invention is to provide a technique for removing a cover from cylindrical seed cotton modules in an expeditious manner.

A more specific object of this invention to provide a method and apparatus for determining which direction a cover is wrapped around a cylindrical agricultural module.

Another more specific object of this invention is to provide a method and apparatus for dealing with a loose piece of plastic on the inside of the cylindrical module.

Another more specific object of this invention is to provide a technique for dealing with a loose plastic tail on the inside of the module.

These and other objects and advantages of this invention will become more fully apparent as this description proceeds, reference being made to the accompanying drawings and appended claims.

BRIEF DESCRIPTION OF THE DRAWINGS

FIG. 1 is a pictorial view of a module feeder incorporating a cover removal station;

FIG. 2 is a partial isometric view of a cylindrical cotton module wrapped with a cover, illustrating that the cover may be wrapped in one direction;

FIG. 3 is a partial isometric view of a cylindrical cotton module wrapped with a cover, illustrating that the cover may be wrapped in an opposite direction;

FIG. 4 is an isometric view of a chain bed conveyor used to convey cylindrical cotton modules toward a disperser;

FIG. 5 is an isometric view of a chain used in the chain bed conveyor of FIG. 4;

FIG. 6 is an enlarged view of a chain link used in the chain bed conveyor of FIG. 4;

FIG. 7 is a pictorial view of a cotton module truck equipped with a modified chain bed type conveyor of this invention;

FIG. 8 is a top view of another type of a slat type conveyor usable with this invention;

FIG. 9 is an isometric view of the slat conveyor of FIG. 8 as it goes around an end sprocket;

FIG. 10 is an enlarged cross-sectional view of the slat conveyor of FIG. 8, illustrating the overlapping nature of the slats;

FIG. 11 is a view similar to FIG. 10 illustrating a different shaped conveyor slat;

FIG. 19 is an isometric view of one side of a slitter frame;

FIG. 20 is an isometric view of the opposite side of the slitter frame of FIG. 19;

FIG. 21 is an isometric view of another embodiment of a cover puller of this invention;

FIG. 22 is an enlarged side elevational view of the cover puller of FIG. 21, certain parts being broken away for clarity of illustration;

FIGS. 23-25 are end views of the device of FIGS. 21-22 illustrating retractable grippers;

FIG. 26 is an isometric view of another embodiment of a cover puller of this invention;

FIG. 27 is a top view of the cover puller of FIG. 26;

FIG. 28 is an end view of the cover puller of FIGS. 26-27;

FIG. 29 is a broken isometric view of a drum of the cover puller of FIGS. 26-28;

FIG. 30 is an isometric view of the cover puller of FIGS. 26-29 showing a cover being pulled therethrough;

FIG. 31 is a schematic view illustrating the relationship between the module 12 and the cover puller of FIGS. 26-30;

FIG. 32 is an isometric view of a disperser and cover removal device showing a pair of doors minimizing cotton leakage from a side of the device;

FIG. 33 is an enlarged isometric view of the doors of FIG. 32;

FIG. 34 is a view looking into the open mouth of the disperser housing illustrating the position of the doors of FIGS. 32-33;

FIG. 39 is a schematic view, similar to FIG. 31, illustrating the operation of a different embodiment of a cover puller of this invention;

FIG. 40 is a broken isometric view of the cover puller shown schematically in FIG. 39 showing an upper belt;

FIG. 41 is another broken isometric view of the cover puller shown in FIGS. 39-40 showing a lower belt;

FIG. 42 is an enlarged broken isometric view of the upper belt drums showing a beater assembly between the drums; and FIG. 43 is an isometric view, similar to FIG. 1, of the application of this invention to a travelling head disperser.

DETAILED DESCRIPTION

Figure 12:
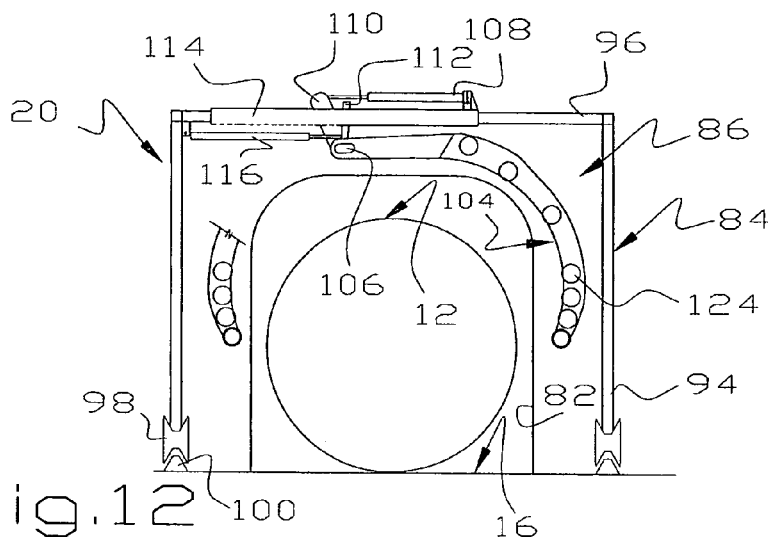
FIG. 12 is a view looking through the module feeder toward the disperser showing the cylindrical cotton module handling equipment out of a path of movement of a conventional rectangular cotton module, certain parts being broken away for clarity of illustration.

Referring to FIG. 1, there is illustrated a module feeder 10 of a type that is capable of handling cylindrical seed cotton modules 12 that are wrapped with a cover or wrapping 14 that is sufficient to shed water. The current cover proposed for use in wrapping seed cotton modules is an organic polymer, or plastic, but it will be understood that this invention is usable with any suitable material that is effective to shed water and it is desired to keep the wrapping material out of the ginned cotton. The current version of the plastic cover is wrapped a plurality of times around the seed cotton and relies on stretch film technology and an adhesive to secure adjacent wraps of the plastic to each other. It will be understood that other suitable techniques for adhering the cover to itself will be apparent to those skilled in the art, such as high or low temperature shrink wrapping techniques, heat sealing techniques, twine, or combinations thereof, and the like. As used herein, the word adhere or adhered is used to describe any suitable technique for securing adjacent wraps of the cover to itself.

The module feeder 10 comprises, as major components, a conveyor 16 for delivering the cotton modules 12 toward a disperser 18 where the modules 12 are disintegrated and a device 20 upstream of the disperser for removing the wrapping 14.

An overriding problem with plastic wrapped cotton modules 12 is that the plastic must be completely removed and not allowed to enter the gin where cotton fibers are separated from cotton seed. The reason is that cotton is used to manufacture threads, yarns and ultimately textiles and the presence of plastic in the ginned cotton is completely unacceptable to textile manufacturers because it will ruin large batches of produced yarn and/or textiles, mainly because it will not take dyes and other textile treatments.

As shown in FIGS. 2 and 3, one of the peculiarities of current generation of plastic wrap 14 is that most of it is adhered or adhesively secured to the underlying or overlying material except for a tail 22 on the inside of the wrapping 14 which is not adhered to the overlying wrap. Current module builders leave about six feet of unadhered tail 22 in a module of nominal eight foot diameter. The tail 22 is unadhered because of the nature of the device that wraps the plastic 14 around the seed cotton. The presence of the tail 22 creates a set of problems in removing the plastic wrapping 14 because the wrapping 14 cannot simply be slit because there is a danger that part of the tail 22 will be severed from the balance of the plastic wrapping 14 and the severed tail 22 will enter the gin, get ground up in some manner and thereby become intermingled with cotton fibers making the ginned cotton fibers unsalable or, worse, getting into a textile operation, ruining a large batch of textiles and creating havoc backwards through the supply chain. It is not a simple matter to adhere the tail 22 to the remainder of the plastic wrapping 14 because of inherent situations in the module builder which cannot readily be cured, at least at the present. Although not shown in FIGS. 2 and 3, the cover 14 overlaps the ends of the module 12 so that water cannot wick up into the seed cotton when the module 12 is laying on its side. This degree of overlap is currently on the order of six inches to one foot.

One peculiarity in the operation of cotton gins is that it is very desirable to provide a consistent flow of cotton to the gin stands in order to promote high sustained rates of cotton going through the gin. Although cotton gins have some surge capacity, it is quite limited and there is no assurance that the surge capacity will be full when there is a reduction in cotton flow from the module feeder toward the gin stands caused by the module feeder. For this reason, it is very desirable to present a more-or-less constant cross-section of cotton to the disperser 18. This leads to the decision to align the cylindrical modules 12 so the cylindrical axis 24 is aligned, or parallel to, the direction of movement 26 of the conveyor 16 as opposed to the situation where the axis 24 is perpendicular to the direction of movement 26 and the module 12 is simply rolled toward the disperser 18. This seems counterintuitive because the natural inclination is to place the cylindrical modules 12 so they can be rolled toward the disperser 18. The problem is that the vertical cross-section of the modules 12 being presented to the disperser 18, in this situation, varies significantly from the edge of the cylinder to its maximum height. By placing the modules 12 with the cylindrical axis 24 aimed toward the disperser 18, the vertical cross-section of the modules 12 is more consistent, leading to more consistent flow of cotton from the disperser 18.

Another peculiarity in the operation of cotton gins is that each farmer's cotton is ginned separately. In other words, the business model of cotton gins is to act as a service to farmers in contrast to a situation where the gin buys seed cotton modules, mixes cotton from various farmers and then sells ginned cotton bales. In order to promote high sustained rates of cotton through the gin, the gin attempts to handle a substantial part of the cotton from a single farmer at one time, i.e. handle multiple cotton modules from the same farmer. In order to promote high sustained cotton flow through the gin, the flow of cotton from the module feeder should be as consistent as possible, meaning that the seed cotton modules should be close to each other as they enter the disperser. This problem is ameliorated somewhat by the nature of most dispersers in that the disperser drums are inclined to a vertical plane so the highest disperser drum is closer to the module. This assures that cotton is being taken off both an old module and a new one, even though they are spaced slightly apart. As used herein, the phrase that the modules are juxtaposed or substantially abutted means there is no substantial change in the rate of cotton feed at the junction of two modules as they move into contact with the disperser drums. Desirably, the only substantial gaps between adjacent modules 12 occur when one farmer's cotton is finished and another is starting. This leads to the desirability of removing the plastic wrap 14 in such a manner that an unwrapped module is juxtaposed to an upstream module so that there is very little change in the rate of cotton flow away from the disperser 18 as one cylindrical module 12 is disintegrated and the next one is started.

A problem with picking up and rotating the cotton modules 12 is in positioning the pickup device so it picks up the module with no overlap, i.e. no attempt is made to pick up the front end of one module and the back end of an adjacent module. One of the characteristics of cylindrical modules is that they are the same length, i.e. from end to end, but vary considerably in diameter depending on how much cotton is delivered into the wrapping device. This allows the pickup and rotating device to be made slightly shorter than the length of the modules 12 and allows the difference in diameter to be used as a technique for distinguishing between one module and an adjacent module. In the alternative, a device is provided to sense the gap between adjacent modules in order to determine where one module starts and another ends. This gap is capable of being detected even though the cylindrical modules are placed as close together as can be accomplished, as will be pointed out more fully hereinafter.

Another problem in handling plastic wrapped cylindrical cotton modules 12 is that the handling or conveying equipment cannot tear the plastic to any substantial extent. The reason is that small pieces of plastic, from the tear, tend to separate from the major part of the plastic wrap, enter the gin and become intermingled with ginned cotton. It will accordingly be seen that many types of conveying equipment commonly used in handling conventional rectangular cotton modules are unacceptable when handling plastic wrapped cotton modules.

An important feature of this invention is to provide a module feeder that will accommodate both conventional rectangular cotton modules and plastic wrapped cylindrical modules. FIG. 1 shows such a device and, although the conveyor 16 must be modified or of a particular type, the disperser 18 is conventional and the conveyor 16 may be conventional, meaning that the only new equipment in the module feeder 10 is the device 20 for removing the plastic wrapping. Thus, a conventional cotton module feeder may be equipped with the device 20 and, after modifying the conveyor 16 to prevent tearing of the plastic, handle both conventional rectangular modules and plastic wrapped cylindrical modules.

Another peculiarity of plastic wrapped cylindrical cotton modules is that the direction of the wrapping will vary. Some of the modules 12 will be placed on the conveyor 16 so that the wrap is in one direction, suggested in FIG. 2, and other modules 12 will be placed on the conveyor 16 so that the wrap is in the other direction, suggested in FIG. 3. Because of the unadhered tail 22 or because it is decided to unwrap the plastic 14, it is often desirable to be able to accommodate cylindrical plastic wrapped cotton modules where the wrap is in either direction. This may be accomplished before the module 12 is placed on the conveyor 16 by orienting the modules 12 in a given direction. It is preferred, however, to design the device 20 to handle modules with the plastic wrapped in either direction.

Given the requirements not to disrupt normal ginning operations and not introduce plastic into the gin, it will be apparent that many constraints are imposed on the design of equipment to remove plastic wrapping from cotton modules. Another constraint for cylindrical cotton module handling equipment before it becomes the exclusive mode of cotton handling between the field and the gin is the ability to handle conventional rectangular modules as well as cylindrical plastic wrapped modules.

Referring to FIGS. 1-10, the conveyor 16 is desirably made in several segments including a long approach conveyor 16', a short conveyor 16" and a conveyor 16'" under the plastic removing device 20. The problems are slightly different because the modules 12 have the plastic wrap 14 on them while on the conveyors 16', 16" but the plastic is off when the module is on the conveyor 16'", as will be more fully apparent hereinafter.

The conveyors 16', 16" may be of many suitable types consistent with the requirement not to tear the plastic wrap 14. Although many different type conveyors are suitable, it is currently preferred to use a continuous moving floor conveyor, a roller bed conveyor, a slat type conveyor where the slats are perpendicular to the direction of movement 26 or a chain bed type conveyor where the pusher elements are modified to prevent tearing of the plastic wrap 14. A chain bed type conveyor is generally not suitable for use as the conveyor 16'" because the chains will simply cut a groove in the cotton without moving the unwrapped module so the conveyors 16'" will typically be a roller bed conveyor, a slat type conveyor or a moving floor.

Referring to FIGS. 4-6, there is illustrated a modified chain bed type conveyor 28 having a series of chains 30 driven in the same direction at the same rate. The chains 30 include conventional chain links 32 joined together by conventional chain pins 34 and an occasional pusher link 36 designed not to tear the plastic wrap 14. The pusher links 36 accordingly comprise a body 38 having openings 40 receiving adjacent chain pins 34. The body 38 includes a top edge 42 parallel to the chain 30 and a leading edge 44, both above the plane 46 of the chain 30, i.e. above the plane of the conventional chain links 32. The top edge 42 and the leading edge 44 define therebetween an obtuse angle 48, of about 130° to about 160°. The leading edge 44 defines, with the plane 46, an acute angle 50 of about 20° to about 50° facing toward the top edge 42. Preferably, the pusher link 36 also includes a trailing edge 52 defining an obtuse angle 54 with the top edge and an acute angle 56 with the plane 46, the acute angle 56 also facing toward the top edge 42. The obtuse and acute angles 54, 56 are of similar sizes to the angles 48, 50.

In normal operation of the module feeder 10, only the leading edge 44 of the pusher link 36 engages the cylindrical modules 12 and would therefore be prone to tearing the plastic wrap 14 so it might appear that making the trailing edge 52 of similar configuration would be wasted effort. In fact, the conveyor 16 is occasionally run in reverse to move the modules 12 away from the disperser 18 in order to correct some problem, so it is desirable, even in module feeders, to provide both leading and trailing edges 44, 52 that are not prone to tear the plastic wrap 14. In addition, it is desirable to convert a conventional module truck 58, see FIG. 7, with a chain bed conveyor 60 to handle cylindrical cotton modules 12 which can be done by replacing conventional pusher links with the pusher links 36. An important feature of the pusher links 36 is that they are capable of handling both conventional rectangular cotton modules, which have a packed cotton bottom abutting the chain 30, and a plastic wrapped cylindrical cotton module 12 having a plastic bottom. If will be evident, of course, that the module trucks 58 have the capability of moving cylindrical modules 12 on and off the truck 58 without tearing the plastic wrapping 14.

Referring to FIGS. 8-10, there is illustrated a slat type conveyor 62 for conveying plastic wrapped cotton modules 12. The conveyor 62 comprises a plurality of rows of slats 64 mounted on a chain (not shown) and wrapped around sprockets or wheels 66, one of which is preferably driven. An important characteristic of the slat conveyor 62 is that the edges close up, or abut, in the run between the end wheels 66 but open up, as shown in FIG. 9, as the slats 64 go around the wheels 66. This prevents substantial amounts of cotton from falling through the slats 64 and collecting on shafts, bearings, platforms and the like below the plane of the slats 64 in the run between the end wheels 66. Unfortunately, there is a tendency for cotton to get trapped at the inlet end of the conveyor 62 because the gaps between the slats 64 open up around the inlet wheel. To avoid this problem, a shield 68 is placed over the inlet end wheel 66 as shown in the lower right of FIG. 8 over that portion of the wheel 66 that would contact loose cotton and where the slats 62 have opened up. and yet allows any trapped cotton to be released as the slats 64

As shown in FIG. 10, one embodiment of the slat 64 provides one end, preferably a front end, with a tapered section 70 that overlies or abuts a curvilinear or bulbous rear end 72 in a more-or-less sealing fashion. As shown in FIG. 12, another embodiment of a slat 74 includes tapered ends 76 that overlie or abut adjacent slats in a more-or-less sealing fashion.

The disperser 18 may be of any suitable type and is illustrated as a conventional disperser having a hood or housing 78 opening toward the conveyor 16'" and providing a series of disperser drums 80 for disintegrating the unwrapped cylindrical cotton module or a conventional rectangular cotton module in a more-or-less conventional manner. Dispersers are commercially available, such as from Stover Equipment Company, Corpus Christi, Tex. As mentioned previously and as shown in FIGS. 1 and 35-38, the disperser drums 80 incline forwardly toward the modules 12 and inherently have the capability of removing cotton from a trailing module and a forward module as the forward module is nearly gone. Thus, the modules 12 do not have to abut, but they do have to be close. The goal is to provide substantially constant cotton flow to the gin. In a way, this can be quantified because, if the modules 12 are further apart than about one foot, cotton flow to the gin is noticeably reduced.

Referring to FIGS. 12-19 and 35-38, the plastic wrap removing device 20 is illustrated in various stages of operation. As discussed previously, an important feature of this invention is to provide a module feeder that will accommodate both conventional rectangular modules and plastic wrapped cylindrical modules. FIG. 12 shows that the operative components of the plastic removing device 20 are movable to a position outside a path of movement 82 of a conventional rectangular cotton module so a conventional rectangular module can pass unhindered through the device 20 into the disperser 18.

The plastic removing device 20 includes a number of components or subsystems including a frame or gantry 84, the conveyor 16'" receiving modules 12 from the conveyor 16, a mechanism 86 suspended from the frame 84 for raising the module 12 off of the conveyor 16'" so an operation may be conducted on the module 12, a system 88 for rotating the module 12, a system for determining the direction of rotation of the wrapping 14, a cover puller 90 for removing the plastic wrap 14, a system for discriminating between one module 12 and a following or downstream module, and a suitable mechanism 92 (FIG. 1) for moving the frame 84 in the same direction and at the same speed as the conveyor 16'", such as one or more hydraulic cylinders or any other suitable mechanism.

The frame or gantry 84 may be of any suitable type and includes suitable columns 94 supporting a pair of beams 96 spanning the path of movement 82. Wheels 98 on the columns 94 cooperate with a pair of tracks 100 allowing the gantry 84 to move toward and away from the disperser 18 as the situation requires.

Figure 13:
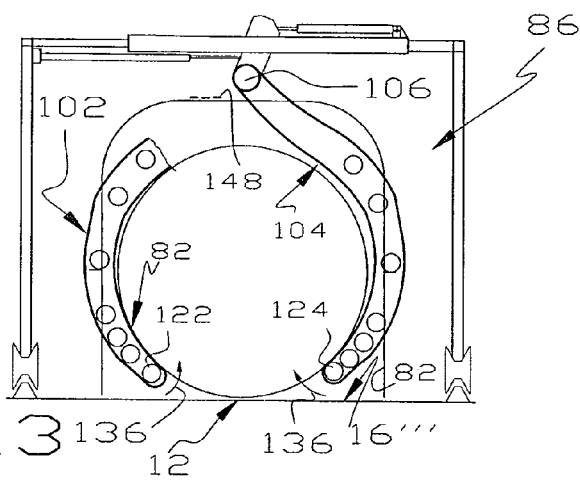
FIG. 13 is a view similar to FIG. 12 showing the cylindrical cotton module handling equipment in an intermediate position between the retracted position of FIG. 12 and a position raising the cylindrical module off the underlying conveyor.
Figure 14:
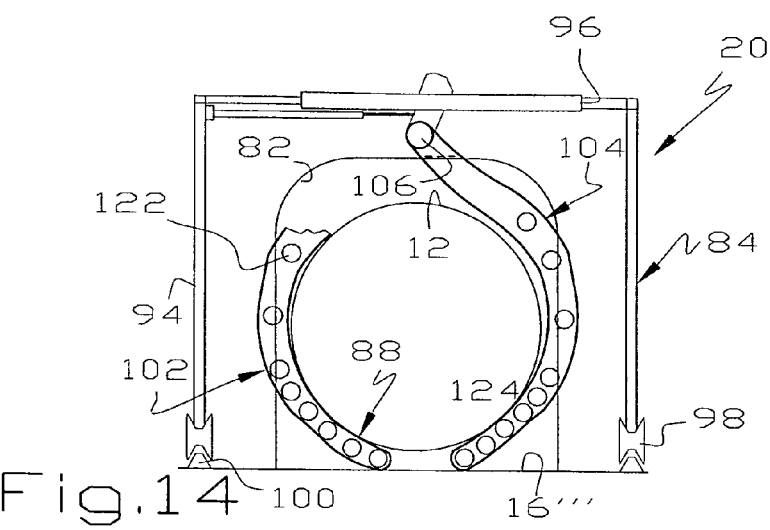
FIG. 14 is a view similar to FIGS. 12 and 13 showing the cylindrical cotton module handling equipment raising the cylindrical module off the underlying conveyor.
Figure 16:
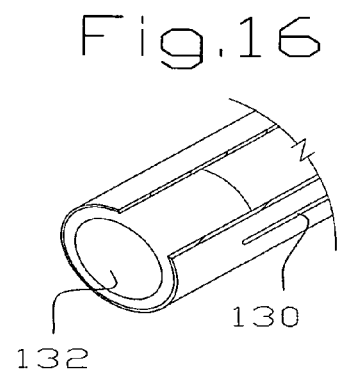
FIG. 16 is a partial broken isometric view of the powered roller of FIG. 15.

The mechanism 86 for raising the modules 12 includes a pair of curved arms 102, 104 arranged to move under the module 12 as shown in FIGS. 12-14. The arm 104 is mounted for pivotal movement about an axis 106. If the gantry 84 can be made high enough, i.e. there is sufficient room in the gin where the plastic removing device 20 is being installed, the pivot axis 106 and the arm 102 simply rotate about the axis 106. If the gin has height limitations and the gantry 84 must be considerably lower, the axis 106 may be movable as shown best by a comparison of FIG. 12 with FIGS. 13-14 where, for purposes of convenience, the mounting of the right arm 104 is shown, it being understood that the mounting of the left arm 102 is a mirror image. Also for clarity of illustration, only the lower part of the arm 102 is shown in FIGS. 12-14. A hydraulic cylinder 108 works on an angled extension 110 of the arm 102 and thereby pivots the arm 104 about the axis 106. The pivot axis 106 is provided by a bearing mounted on a strut 112 fixed to a bracket or sleeve 114 slidable on the beam 96 as propelled by a hydraulic cylinder 116. It will accordingly be seen that the pivot axis 106 is movable from side-to-side while the arm 104 is pivoted about the axis 106 to provide the clamshell type action shown in FIGS. 12-14. The cylinders 108, 116 are synchronized to lower and close the arms 102, 104 about the module 12 and to raise and move the arms 102, 104 to a stowed position under the gantry 84.

Synchronization of the arms 102, 104 may be accomplished either by the use of suitable sensors detecting the position of the output rods of the cylinders 108, 116 at suitable times or by the use of rephasing cylinders. It is preferred to use sensors such as commercially available under the name Tempasonics as are available from Power Systems of Florida of Titusville, Fla.

An important feature of this invention is maintaining the modules 12 more-or-less juxtaposed as they enter the disperser 18 in order to provide more consistent cotton flow out of the disperser 10. An initial step is to abut the modules 12 at the inlet end of the conveyor 16', and making the upstream conveyors 16" capable of running faster than the conveyor 16'. Similarly, any remaining gap between adjacent modules 12 is closed up by running the conveyor 16" faster than the conveyor 16'''. Suitable sensors 120 (FIG. 1) are provided at the junction of the conveyors 16', 16" and 16''' to determine that a gap exists between successive modules 12. A suitable signal is generated to speed up the upstream conveyor and thereby close up any gap. It will be appreciated that the conveyor 16''' is typically run at rather slow speeds because of the time involved for the disperser 18 to digest the modules 12 so it is relatively easy for the conveyors 16', 16" to close up any gap between successive modules 12 as they move onto the conveyor 16'''.

Carried on the arms 102, 104 are a series of powered rollers 122, 124. As shown best in FIG. 15, the rollers include an outer cylindrical surface 126 for contacting the cylindrical module 12. At least some of the rollers 122, 124 having a roughener 128 to increase the friction between the surface 126 and the plastic wrapping 14 of the module 12. The roughener 128 comprises extensions projecting out of the cylindrical surface 126 of any suitable shape. Preferably, the extensions comprise metal components welded or otherwise affixed to the surface 126 and preferably comprises a series of elongate rods 130 spaced about the periphery of the cylindrical surface 126. It will be apparent that the roughener 128 may be any suitable projection from the cylindrical surface 126 that does not tear the plastic wrap 14.

Figure 15:
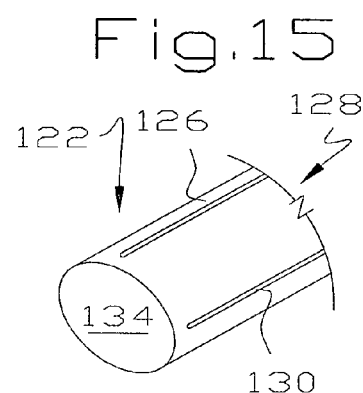
FIG. 15 is a partial isometric view of a powered roller comprising a part of the cylindrical cotton module handling equipment of this invention.

An important feature of the rollers 122, 124 is that the hydraulic motors 132 rotating the rollers 122, 124 are located inside the cylindrical surface 126 so that the motors 132 do not provide abutments for cotton to impact or snag on and allow the rollers 122, 124 to be long relative to the length of the modules 12. For example, if the motors 132 were mounted externally, the rollers 122, 124 would have to be shorter because the motors would contact the upstream and/or downstream modules 12 on the conveyor 16'''. FIG. 15 is a view of one end of the roller 122 with an end cap 134 removed to expose the motor 132. It will be apparent that suitable hydraulic fittings (not shown) extend through the end cap 134 delivering hydraulic fluid to the motor 132. As the arms 102, 104 move toward the position of FIG. 14, the rollers 122 engage the plastic wrap 14 of the module 12. Another important feature of this invention is the ability to rotate the module 12 without tearing the plastic wrap 14. To this end, the motors 132 are driven at a speed so there is no relative movement between the periphery of the roller 122 and the plastic wrap 14 as the arms 102, 104 converge. In other words, the rollers 122, 124 roll on the plastic wrap 14 but do not slip relative to the plastic wrap 14. This is accomplished by a control unit that controls the amount of hydraulic fluid delivered to the motors 108, 116 and to the motors driving the rollers 122, 124. It will be apparent that during this motion of the arms 102, 104, the rollers 122 are turning in opposite directions as suggested by the arrows 136.

As the arms 102, 104 converge to the position shown in FIG. 14, the outermost ends of the arms move under the module 12 and raise the module 12 off the conveyor 16''' so that one or more operations may be conducted on the module 12. For most of these operations, it is necessary or desirable to rotate the module 12 about its axis 24 shown in FIG. 1. To this end, the rollers 122 rotate in the same direction, thereby imparting an opposite direction of rotation to the module 12. The rollers 122 will be seen to be a system for rotating the modules 12 as well as part of the system for raising the module 12 off the underlying conveyor 16'''.

There are two potential ways to remove the plastic wrap 14. First, the wrap 14 may simply be unwrapped, making as many revolutions of the module 12 as is necessary. Second, the wrap 14 may be slit and then unwrapped, meaning that only one revolution or less of the module 12 is needed. Both techniques are within the scope of this invention, although it is preferred to slit and then unwrap the module for a variety of reasons. First, a single layer of the plastic wrap 14 is relatively weak and prone to tear thereby creating the potential of allowing plastic to enter the gin. Second, it is sometimes difficult to start the unwrapping process because the outer end of the wrap 14 is intentionally well bonded to the next lower layer. Third, because of the weakness of the plastic wrap 14, rotating the module 12 becomes less reliable when only one or two layers remain. Even though slitting the plastic wrap 14 requires an additional subsystem, it is currently the preferred technique.

To prevent plastic from entering the gin and to thereby successfully slit the plastic wrap 14, it is necessary to locate the tail 22 so any cut is well away from the tail. Although there are many different ways to do so, one way to start is by locating the outside edge 138 of the wrap 14 shown in FIGS. 2-3. This is conveniently done by locating a device 140 placed on the wrap 14 at the time the module 12 is made. The device 140 is consistently positioned on one end of the module 12 as it is being wrapped, as by a suitable device in the module builder. The device 140 may be of many different types, e.g. a strip detectable by a magnetic reader, a bar code label, an RFID tag or the like. In the event an RFID tag is used, it may be encoded with suitable information such as the name of the farmer, the field location, the cotton variety, where the module is located in the field or in the gin yard and the like.

The device 140 may be located simply by placing two detectors 142 (FIG. 17) on opposite ends of a suitable member, such as a slitter 144 used to cut the plastic wrap 14 as discussed more fully hereinafter. As the module 12 is rotated, one or the other of the detectors 142 indicate the presence of the device 140 and the other detector 142 will indicate the absence of the device 140. By determining which end the device 140 is on, one will know whether the module 12 is positioned as in FIG. 2 or as in FIG. 3 and thereby know which direction the wrap 12 is wound.

One convenient way to determine the location of the tail 22 is to take advantage of the fact that the current version of module builders employs plastic sheets of a predetermined length. There is considerable variation in the diameter of modules from the current version of module builders but, by determining the diameter, the location of the tail 22 becomes known when one also knows the location of the device 140. The diameter of the module 12 can be determined in a variety of ways. It can be done directly by a distance measuring device, such as a laser device made by Power Systems of Florida of Titusville, Fla. mounted on the gantry 84 and looking downward at the module. The diameter can also be determined by rotating the module 12 at a known speed, as by driving the rollers 122 at a known speed, and measuring the time it takes for the device 140 to twice pass the detector 142. Knowing the location of the edge 138 because the device 140 is adjacent the edge 138 and the diameter of a particular module 12 allows the rotation to be stopped at a location where the tail 22 is far removed from the slitter 144 shown in FIGS. 17-18. It will accordingly be seen that the detector 142 cooperates with a control unit 146 which monitors and controls other functions of the plastic removing device 20, such as the hydraulic system driving the motors 132, to provide a system for locating the tail 22.

The control unit 146 also controls rotation of the rollers 122 so that, after the location of the tail 22 is determined, the module 12 is rotated a substantial distance to position the tail 22 far from the slitter 144. Typically, the module 12 is rotated so the tail 22 is 180° from the slitter 144 or so that the tail 22 is at the bottom of the module 12 adjacent the conveyor 16'''. If an RFID tag is used as the device 140, this is best accomplished by rotating the bale 12 until the RFID tag 140 is sensed twice by the detectors 142. The bale 12 is then rotated an additional one half revolution. This method does not require knowing which direction the bale 12 is wrapped.

The cover 14 may be cut in a variety of ways, such as with a mechanical slitter as disclosed hereinafter, or with other suitable cutting equipment, such as an abrasive jet, a water jet or the like. The slitter 144 cuts the plastic wrap 14 in a linear fashion and in a direction parallel to the module axis 24 and the direction of movement 26 and is accordingly located between the arms 102, 104 at a location 148 (FIG. 13) and is mounted for movement toward and away from the module 12. To this end, the slitter 144 comprises a frame 150 supported by arms 152 of a movable subframe 154 carried by the gantry 84. One or more hydraulic cylinders 156 slide the subframe 154 up and down relative to the columns 94 thereby raising and lowering the slitter 144.

The slitter 144 includes two or more cutting devices 158 comprising a hub 160 driving a rotary knife 162 such as a sharp unserrated wheel which cleanly slits the plastic cover 14 without snagging cotton fibers. As shown best in FIGS. 19-20, each hub 160 is mounted on a subframe 164 pivoted by a pin 166 to a member 168. The arc of pivotal movement of the subframe 164 is constrained for purposes more fully apparent hereinafter. The rotary knives 162 are driven in any suitable fashion, as by a chain drive 170 shown in FIG. 20. A motor (not shown), on the member 168 drives a sprocket 172 which drives shafts 174 on which the knives 162 are mounted. The hubs 160 act as large rollers to engage the cylindrical module 12 and thereby position the cutting edge of the knives 162 at an appropriate distance from the plastic cover 14 to be cut. It is desirable that the cut be through the plastic cover 14 but not substantially into cotton inside the modules 12. It will be seen that the knives 162 are separately pivotally mounted so one knife can be substantially below the other in order to accommodate a module which is tapered rather than more-or-less cylindrical.

Because space is at a premium between the arms 102, 104, it is desirable to move the knives 162 as little as practical in the direction of conveyor movement 26 which corresponds to the direction of movement of the modules 12 through the module feeder 10. For this reason, more than one cutting element is provided, meaning that the amount of linear movement of the member 168 is reduced. The member 168 may be moved in any suitable manner relative to the frame 150. A convenient technique for moving the member 168 is to provide a rack 176 on the member 168 and a motor (not shown) having a sprocket (not shown) on the frame 150 so that rotation of the motor causes the member 168 to move in the direction 26 and thereby advance one of the knives 162 from one end to about the middle of each module 12 while the other knife moves from about the middle of each module 12 to the other end, thereby slitting the cover 14 from end to end. Any suitable technique may be used to stop movement of the member 168, such as a limit switch or photoelectric eye.

After the cover 14 is slit, it is necessary to remove the cover from the fibrous material inside the module. To this end, the cover puller 90 is provided. Broadly, there are at least two operating concepts for a puller: (1) a prong type puller that has elements that attempt to penetrate the cover in order to gain traction and (2) a friction based puller that relies only on friction surfaces to gain traction. A friction type puller is disclosed in connection with FIGS. 39-42. Although several versions of a prong type cover puller are disclosed, it will be apparent that they have certain common characteristics: (1) they have some way of applying the prongs to the cover 14, (2) they have some way to pull on the cover 14 after it is grasped, (3) they have some way to move the cover 14 as it is unwinding or after it is unwound to a disposal location and (4) they have some way of retracting the prongs and thereby releasing the grasp on the cover 14. For purposes of economy, the cover puller 90 may be suspended on the same subframe 154 as the slitter 144 and thus move up and down with the slitter 144. From an optimum operational standpoint, it is preferred to mount the cover puller 90 on a separate subframe (not shown) on the opposite side of the gantry 84 so the slitter 144 and the cover puller 90 may be operated independently.

Figure 17:
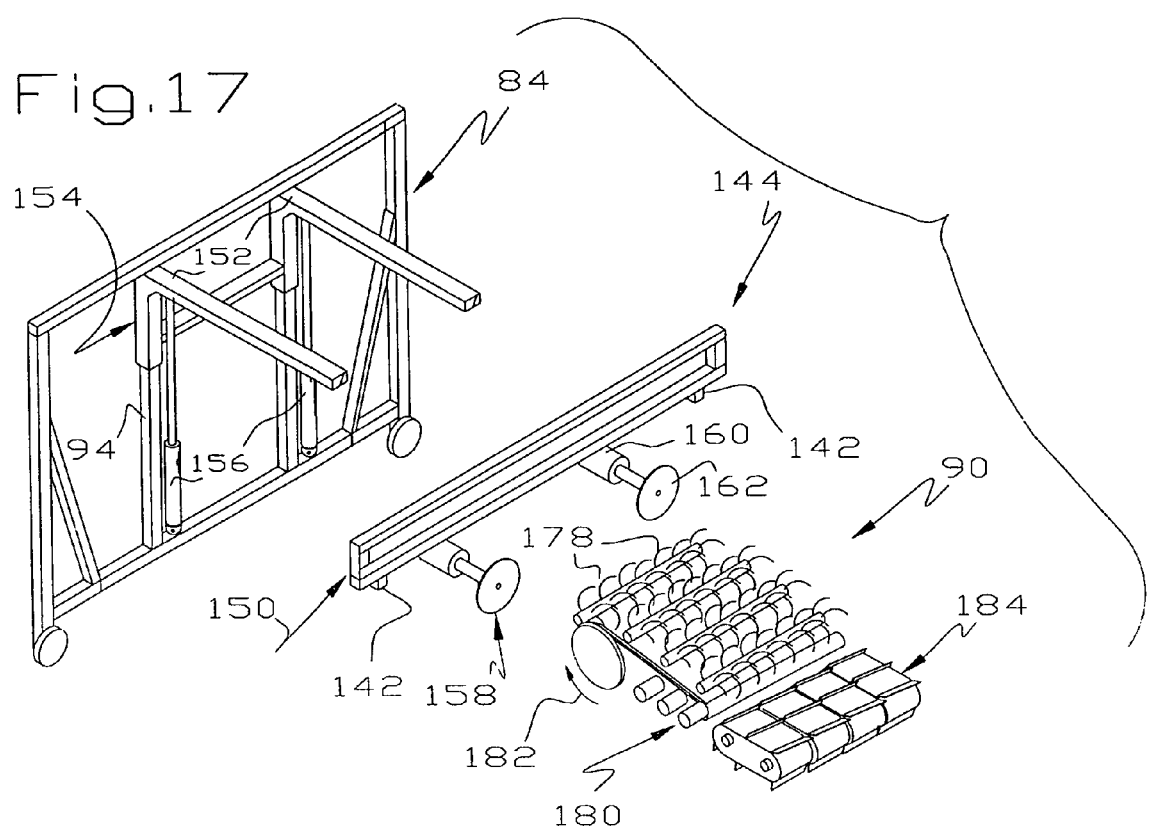
FIG. 17 is an isometric view of a system for slitting the cover and a system for removing the cover from the module after it is slit.
Figure 18:
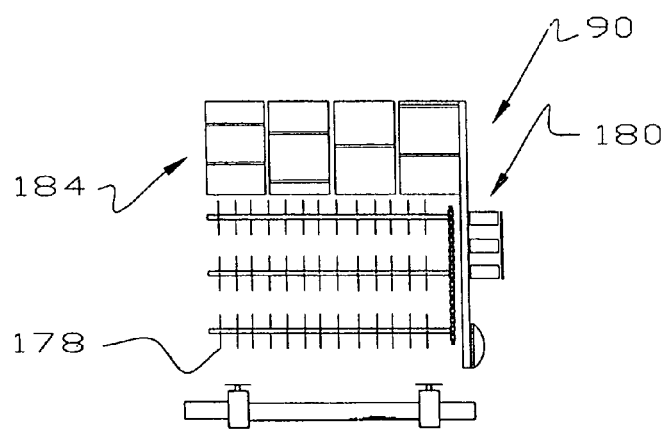
FIG. 18 is a top view of the systems of FIG. 17.

To these ends, the cover puller 90 may come in several versions. Shown in FIGS. 17-18 is a modified windrowing device made by Sund Manufacturing of Newburg, N. Dak. The cover puller 90 accordingly provides a series of fingers 178 mounted in rows. A mechanism 180 moves the rows of fingers 178 in the direction shown by the arrows 182 so they grasp a free end of the slit cover and pull it over the top of the puller 90. As each row of fingers 178 nears the end of the puller 90, they retract, leaving the cover 14 free to be picked up by an outfeed conveyor 184 and moved to a disposal location to one side of the frame 84. It will accordingly be seen that the cover puller 90 is driven at the same time the module 12 is rotated so the wrap 14 is pulled off the module 12 as it is rotated.

Referring to FIGS. 21-25, another cover puller 186 is illustrated comprising a basket or funnel shaped frame 188 having upper and lower rims 190, 192. The position of the slitter 144 and the cover puller 186 relative to a module 12 and the direction of movement 26 is shown in FIG. 21. A plurality of spikes or sharpened fingers 194 extend from the bottom of the lower rim 192 and act to pierce the cover 14 when the puller 186 is forced into the module 12. Inside the lower rim are a plurality of normally retracted slats 196 pivotally mounted on an inner hub 198. At the outset of rotation of the funnel frame 188, the slats 196 are advanced by rotation of the inner hub 198 through a limited arc as suggested by the arrow 200. The cover puller 186 is mounted on a subframe 202 similar to the subframe 154 in FIG. 17 and is raised and lowered by the provision of hydraulic cylinders operating on the sleeves 204. When the funnel frame 188 is forced into the module 12, the fingers 194 pierce the cover 14 and the inner hub 198 is drivably rotated to advance the slats 196. Drivably rotating the funnel frame 188 while rotating the module 12 causes the cover 14 to unwind from the module 12 and wrap around the funnel 188. After the cover 14 is removed from the module 12, the puller 186 is raised, away from the module 12, and moved to a disposal location adjacent a side of the frame 84. The slats 196 are then retracted by rotating the inner hub 198 in a direction opposite to the arrow 200. The cover 14 then falls off the funnel 188 into a disposal area.

Referring to FIGS. 26-31, there is illustrated another cover puller 206 of this invention comprising, as major components, a frame 208, a pair of drums 210, 212 driven in counterrotating directions and a driven outfeed conveyor 214. The frame 208 is raised and lowered much like the frame 202 of the cover puller 186 in FIG. 21. The drums 210, 212 include an outer cylinder 216, 218 having a series of openings 220, 222 therein through which spikes or rods 224, 226 extend. FIG. 29 is an isometric view of the drum 210, it being understood that the drum 212 is essentially identical. The rods 224 of the drum 210 are mounted on a crank-shaft 228 having an axis 230 offset from an axis of rotation 232 of the cylinder 216, meaning that the rods 224 move in and out, relative to the exterior of the cylinder 216, as the cylinder 216 rotates. The crankshaft 228 is adjustably mounted inside the cylinder 216 so the amount of in and out movement is adjusted. The drums 210, 212 are adjustably mounted on the frame 208 so the arcuate location of the maximum extension of the rods 224, 226 can be rotationally adjusted, horizontally adjusted and vertically adjusted. As seen best in FIGS. 26 and 31, the upper drum 212 is forward of the lower drum 210 so the slit cover 14 can be removed from the top of the module 12 in a manner that the free end 234 of the cover 14 passes, in a more-or-less straight horizontal path into the bight between the drums 210, 212. Those skilled in the art will recognize the drums 210, 212 as being front beater spikes in the auger of a combine.

It will be realized that the width of the cover 14 being pulled through the puller 206 is greater than the width of the drums 210, 212 because the cover puller 206 has to reside between the arms 102, 104 which are slightly less than the length of the module 12. Thus, some provision needs to be made to reduce the width of the cover 14. To this end, a pair of rollers 236 force the cover 14 into the opening between the drums 210, 212 as the cover 14 is being pulled into puller 206. After the cover 14 has been pulled from the module 12, the outfeed conveyor 214 delivers it to a disposal location, such as a large trash container. It will accordingly be apparent that the outfeed conveyor 214 may be of any suitable type.

Referring to FIGS. 32-34, another feature of this invention is illustrated. After the cover 14 has been slit and removed from the module 12, there is nothing to prevent cotton or other material inside the module from sloughing off and falling outside the frame 84 so that a worker has to continually shovel or otherwise encourage this material to pass into the inlet of the disperser 18. To minimize this problem, a pair of mirror image doors 238, 240 are provided that act in conjunction with a stationary transition panel 242 bolted to the frame of the disperser housing 78. The transition panel 242 simply prevents cotton from passing on the outside of the disperser housing 78. Each of the doors 238, 240 comprises a lower panel 244 and an upper panel 246. The lower panels 244 are pivoted to plates 250 secured to the floor of the gin forward of the disperser 18. The upper panel 246 is pivotally connected by a suitable connection 252 to the lower panel 244.

A hydraulic cylinder 254 is pivotally mounted on a stand 256 and pivotally connects to the lower panel 244 for pushing the lower panel 244 from an outwardly inclined position to a more nearly vertical position as shown in dashed lines in FIG. 34. The upper panel 246 reclines against a pad 258 supported by a column 260 which is preferably vertically adjustable. When the cylinder 254 pushes the lower panel 244 toward its more vertical position, the upper panel 246 simply slides on the pad 258 and assumes a more inclined position shown in dashed lines in FIG. 34. The ends of the panels 244, 246 are curved and slidably abut the stationary panel 242 during movement between the solid and dashed line positions shown in FIG. 34.

Operation of the doors 238, 240 should now be apparent. As suggested from FIGS. 12-14, it will be seen that the arms 102, 104 move toward and away from the gantry 84 creating clearance problems between the arms 102, 104, the gantry 84 and the doors 238, 240. In order to accommodate movement of the arms 102, 104, the doors 238, 240 are moved to the solid line position of FIG. 34 where the doors 238, 240 are concave toward each other providing greater clearance at times when the arms 102, 104 are moving or when the arms 102, 104 are encircling a module 12 at a time when the gantry 84 is adjacent the disperser housing 78. It will be appreciated that FIG. 12 illustrates a situation where the gantry 84 has been moved away from the disperser 18 in order to pick up the module 12. At such times, the gantry 84 is at the position shown in FIG. 1 where the gantry 84 is spaced from the doors 238, 240 and there is no danger of collision between the arms 102, 104 and the doors 238, 240.

When the gantry 84 moves toward the disperser 18 with the arms 102, 104 down, as shown in FIGS. 13-14, there is a danger of collision, so the cylinder 254 is actuated to move the doors 238, 240 to their concave position shown in FIG. 34, thereby allowing the arms 102, 104 to pass. It is desired to move the panels 242 to its more nearly vertical position when the cover 14 has been removed from the module 12 and the arms 102, 104 have been retracted. This will push any cotton resting against the stationary transition panel 242 onto the conveyor 16''' and thereby into the disperser 18.

Figure 35:
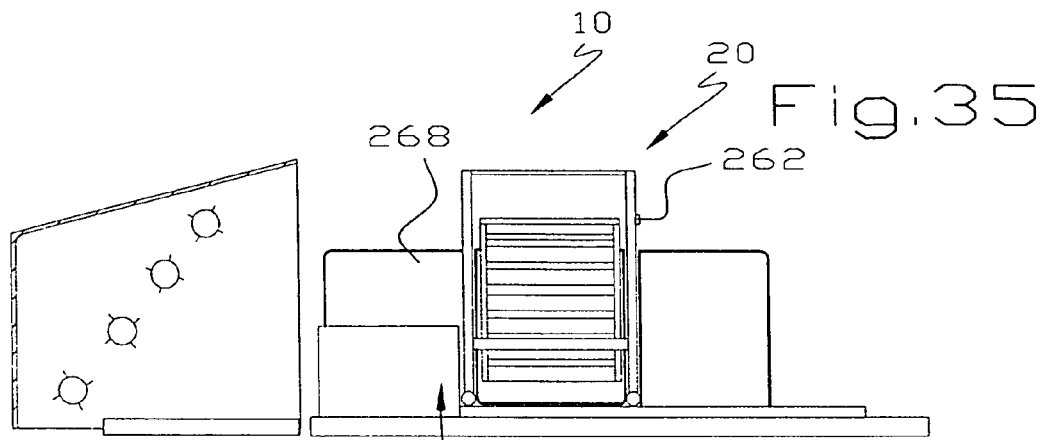
FIG. 35 is a side view of the module feeder showing the cylindrical cotton handling equipment in the process of being lowered toward a cylindrical cotton module.
Figure 36:
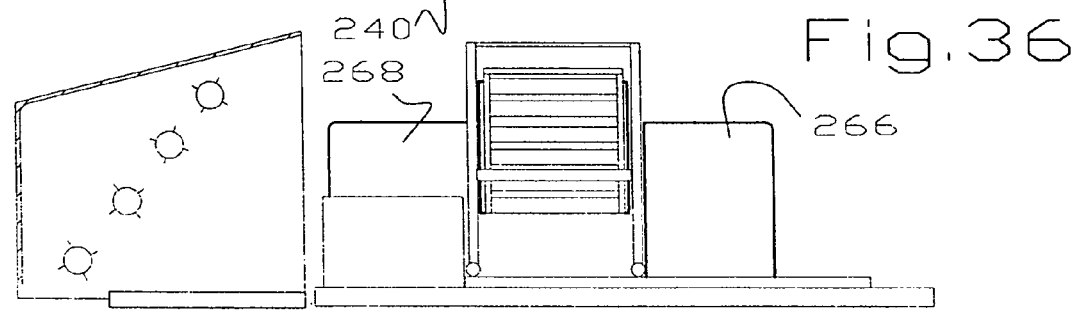
FIG. 36 is a side view of the module feeder in the course of picking up a cylindrical cotton module.

As mentioned previously, another feature of this invention is the provision of a system for discriminating between one module 12 and a following or downstream module. This is necessary to actuate the arms 102, 104 at an appropriate time so they pick up a module immediately below the device 20, as contrasted to a situation where the arms 102, 104 attempt to pick up the rear end of one module and the front end of a trailing module. To this end, a detector 262 is provided as shown in FIG. 35. The sensor 262 may be of any suitable type, such as a laser distance measuring device from Smith & Gray of Columbus, Ga. Devices of this type operate because there is always a very small gap between adjacent modules, caused by the module slumping.

Operation of the module feeder 10 of this invention should now be apparent. Referring to FIGS. 1, 12-14 and 35-38, a series of modules, in more or less abutting relation, pass from the conveyor 16' onto the conveyor 16" and then onto the conveyor 16'''. In the event there is a substantial gap between the module 12 and the following module, the gap is sensed by one of the sensors 120 and the upstream conveyor is speeded up thereby closing the gap. With the gantry 84 in its furthermost location away from the disperser, i.e. in the position shown in FIG. 35, the sensor 262 discriminates between the module 264 underneath the gantry 84 and the following module 266. The output from the sensor 262 is an input detected by the control unit 146 to actuate the cylinders 108, 116 to move the arms 102, 104 downwardly to engage and pick the module 264 up off the conveyor 16''' as suggested in FIG. 36.

The module 264 is then rotated to detect the direction of wrap of the cover 14 and to determine where the tail 22 is located. The module is then rotated to position where the tail 22 is away from the slitter 144. The slitter 144 is then lowered so the knives 162 are low enough to cut the cover 14 and the frame member 168 is moved to draw the knives 162 across the module and thereby slit the cover 14 from end to end. The cover puller is then lowered into contact with the module and the cover 14 pulled off as the module 12 is rotated in a desired direction. It will be appreciated that it is desirable to pull the cover 14 into the cover puller so that the adhered end of the tail 22 passes first into the cover puller as suggested in FIG. 31. It will be seen that the rollers 122, 124 are capable of rotating the module in either a clockwise or counterclockwise direction. This is particularly important if it is desired to unwrap the cover 14 from the module 12 rather than slit it first and then pull the cover 14 off. In addition, the ability to rotate the modules 12 in both directions gives the option to pull the cover 14 off on either side of the device 20.

Figure 37:
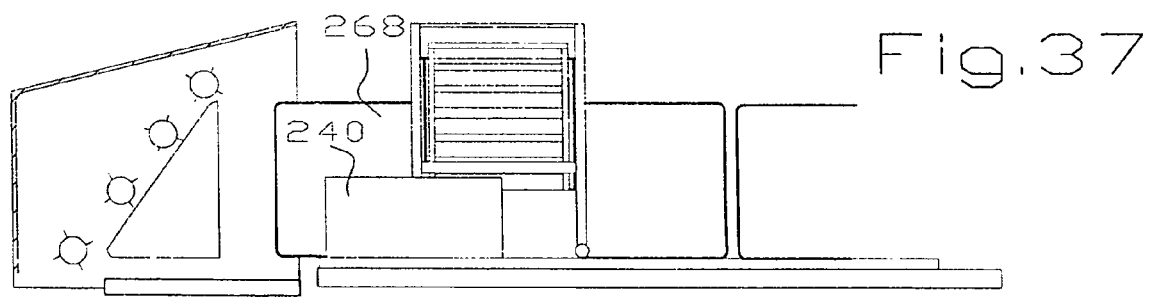
FIG. 37 is a side view of the module feeder in the operative position of FIG. 14, showing the cylindrical cotton handling equipment in a position raising the cylindrical module off the underlying conveyor.

While conducting these operations on the module immediately beneath the gantry 84, all of the modules on the conveyor 16 continue to move toward the disperser 18. In order to keep its place in line, the gantry 84 moves toward the disperser 18 at the same speed as the conveyor 16''' as controlled by the cylinders 92. It will accordingly be seen that the gaps between the modules 268, 264, 266 do not change substantially during the operation of the module feeder 10. After the cover 14 has been pulled from the module 264, it is discarded by the side of the gantry 84 at a disposal location. In other words, the gantry 84 moves toward the disperser 18 at the same speed, or synchronously, with movement of the conveyor 16'''. The control unit 146 then instructs the cylinders 108, 116 to move the arms 102, 104 to lower the module 264 back onto the conveyor 16''' as shown in FIG. 37 at a location near the end of the conveyor 16'''.

Figure 38:
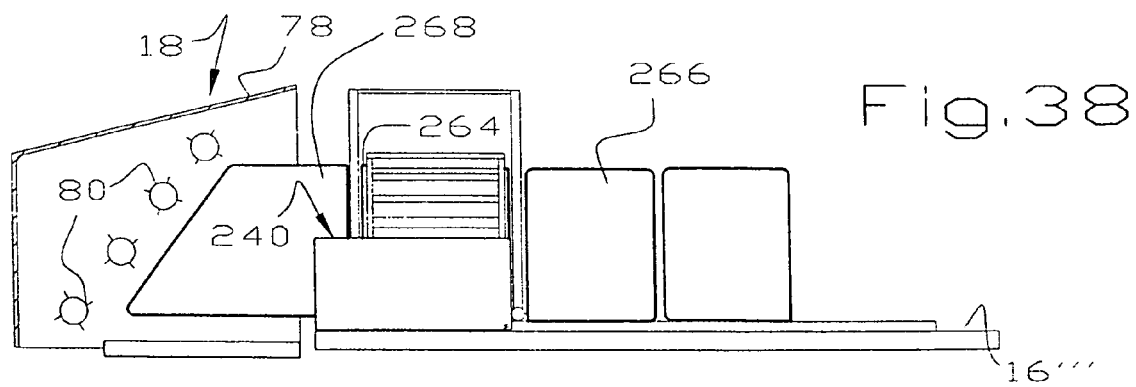
FIG. 38 is a side view of the module feeder at a location where it is placing the unwrapped cylindrical module back onto the conveyor.

FIG. 38 represents the situation where the arms 102, 104 have replaced the module 264 onto the conveyor 16''' in response to commands from the control unit 146. The next movement of the device 20 is to raise the arms 102, 104 to a position where the gantry 84 can be moved away from the disperser 18 by the cylinders 92 and moved upwardly toward the position shown in FIG. 12, also in response to commands from the control unit 146. The next movement of the device 20 is to move the gantry 84 to the position shown in FIG. 31 where the cycle starts again.

Referring to FIGS. 39-42, there is illustrated another embodiment of a cover puller 270. Although the schematic view of FIG. 39 illustrates a situation where the cover 14 has been cut, the puller 270 is adept at unwinding the cover 14 as will be apparent hereinafter. The puller 270 comprises a frame 272 on which is mounted an upper set of belts 274 and a lower set of belts 276. As shown best in FIGS. 40-41, the belts 274, 276 extend from an inlet end 278 of the frame 272 to an outlet end 280 so that movement of the cover 14 through the puller 270 is shown by the arrow 282. The belts 274, 276 are mounted on drums 284, 286 driven in any suitable manner.

The belts 274 pass over an intermediate roller 288 and around an end roller 290 and back to the drums 284. The belts 276 pass over an intermediate roller 292 and around an end roller 294 and back to the drums 286. An important feature of the puller 270 is a series of beater assemblies 296 located between the drums 284 of the upper belt 272 as shown best in FIG. 42. The beater assemblies 296 include a series of flexible beating elements 298 mounted by a suitable connection (not shown) to a shaft 300 between adjacent drums 284. The elements 298 extend beyond the periphery of the drums 284 so they beat on the cover 14 as the puller 270 is lowered next to the module 12. The beating elements 298 act to separate the slit end 302 of the cover 14, or the end of the cover 14 in the event the cover 14 is simply unwound from the module 12, and deliver the slit end 302 to the bight between the drums 284, 286 so that the cover 14 is propelled into engagement between the lower run of the belt 274 and the upper run of the belt 276. The belts 274, 276 are accordingly closely spaced and pull the cover 14 in the direction shown by the arrow 282 during removal. A series of fingers 304 supported by a bracket (not shown) may be provided near the outlet end 280 of the puller 270 to separate the cover 14 from the upper belt 272, there being the potential for the cover 14 to come up over the top of the puller 270.

Referring to FIG. 43, there is illustrated an older type disperser 310 known as a traveling head disperser because modules are placed by a module retriever truck in a line in front of the disperser 310 and the disperser 310 is moved by suitable means in the direction of the arrow 312 to disintegrate modules lined up in front. The disperser 310 includes a hood or housing 314 and a series of disperser heads 316. Travelling head disperser 310 is typically mounted on rails 318 secured to a concrete floor for movement toward and away from modules placed in front of the hood opening.

A device 320 of this invention is mounted in front of the disperser 310 in some manner so it does not contact the disperser 310, such as by providing an outer set of rails (not shown) so the device 320 can move over the top of the disperser 310, or the device 320 is simply mounted in front of the disperser 310 which will effectively reduce the number of modules that the disperser 310 can digest in one cycle of movement.

The device 320 contains essentially the same components as the device 10, i.e. a support 322 such as a gantry, a device 324 for raising and lowering each module 12 in order to remove the cover 14 and a mechanism (not shown) to move the support 322 from one module 12 to the next. The operation of the disperser 310 is much like the operation of conventional travelling head dispersers. The module retriever truck discharges the cylindrical modules 12 in a line in front of the disperser 310 with the modules 12 essentially abutting. The device 320 moves to each module 12, picks it up, removes the cover 14 and replaces the module in its place, either at the front or rear of a row of modules 12, or in between adjacent modules 12. After the device 320 has unwrapped the first module adjacent the disperser 310 and moved toward the second module, the disperser 310 can be moved toward the first module to disintegrate it as the device 320 is working on the second module.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A module feeder for delivering seed cotton clumps to a cotton gin stand comprising
    a disperser having a vertically extending open front defined by a top wall and side walls and a series of disperser drums therein extending between the side walls, said disperser drums comprising a topmost drum, a bottom most drum and at least one intermediate drum vertically spaced in said disperser so as to reduce the contents of a seed cotton module to clumps for deliv-ering the clumps to the gin stand,
    a conveyor having opposite ends and conveyor elements overriding a stationary base and extending horizontally from said open front below said bottom drum whereby said conveyor is adapted to convey seed cotton modules into the open front of the disperser,
    unwrapper equipment intermediate the ends of the conveyor for assisting in unwrapping wrapped seed cotton modules and having a downstream end upstream of the disperser open front, and
    a panel disposed at a fixed location on each side of the conveyor extending in a conveying direction of travel of the conveyor from adjacent the disperser open front to at least the downstream end of the equipment and extending upwardly from a first location no higher than said conveyor elements of the conveyor to a second location position above the conveyor to at least a predetermined height above the lowermost intermediate disperser drum to prevent material in the module from escaping off a side of the conveyor between the unwrapping equipment and the disperser.

2. The module feeder of claim 1 wherein each panel comprises a lower panel and an upper panel pivoted to the lower panel for movement between generally vertical positions and positions concave toward each other.

3. The module feeder of claim 1 wherein each panel is imperforate.

4. The module feeder of claim 1 wherein the unwrapping equipment includes a device for picking the module up off said conveyor elements and a mechanism for rotating the module when it is off the underlying surface.

5. The module feeder of claim 1 wherein said wrapped seed cotton module has a rectangular cross section transverse to the direction of travel of said conveyor.

6. The module feeder of claim 5 further comprising means mounting the unwrapper equipment adjacent the conveyor for movement from a first position blocking movement of said rectangular module toward the disperser to a second position allowing movement of the rectangular module toward the disperser.

7. The assembly of claim 1 wherein said wrapped seed cotton module has a circular cross section transverse to the direction of travel of said conveyor.

8. The assembly of claim 7 further comprising means mounting the unwrapper equipment adjacent the conveyor for movement from a first position blocking movement of said circular module toward the disperser to a second position allowing movement of the rectangular module toward the disperser.

9. The module feeder of claim 1 wherein said panels extend above the conveyor to at least half way between the uppermost and lowermost disperser drums.

10. A method of operating a module feeder for delivering seed cotton clumps to a cotton gin stand,
    said module feeder comprising a disperser having a vertically extending open front defined by a top wall and side walls and a series of disperser drums therein extending between the side walls, said disperser drums comprising a topmost drum, a bottom most drum and at least one intermediate drum vertically spaced in said disperser so as to reduce the contents of a seed cotton module to clumps for delivering the clumps to the gin stand,
    a conveyor having opposite ends and conveyor elements overriding a stationary base and extending horizontally from said open front below said bottom drum whereby said conveyor is adapted to convey seed cotton modules into the open front of the disperser,
    unwrapper equipment intermediate the ends of the conveyor for assisting in unwrapping wrapped seed cotton modules and having a downstream end upstream of the disperser open front, and
    a panel disposed at a fixed location on each side of the conveyor extending in a conveying direction of travel of the conveyor from adjacent the disperser open front to at least the downstream end of the equipment and extending upwardly from a first location no higher than said conveyor elements of the conveyor to a second location above the conveyor to at least a predetermined height above the lowermost intermediate disperser drum to prevent material in the module from escaping off a side of the conveyor between the unwrapping equipment and the disperser;
    said method comprising
    positioning wrapped seed cotton modules on the conveyor upstream of the unwrapping equipment;
    horizontally conveying the wrapped seed cotton modules on the conveyor to the unwrapper equipment;
    unwrapping each seed cotton module at the unwrapper equipment;
    preventing seed cotton material from each unwrapped module from escaping off a side of the conveyor between the unwrapping equipment and the disperser via each side panel; and
    horizontally conveying each unwrapped module on the conveyor into the disperser for producing clumps of seed cotton.

11. The method of claim 10 wherein each panel is imperforate.

12. The method of claim 10 wherein each panel comprises a lower panel and an upper panel pivoted to the lower panel for movement between generally vertical positions and positions concave toward each other.

13. The method of claim 10 wherein said wrapped seed cotton module has a rectangular cross section transverse to the direction of travel of said conveyor.

14. The method of claim 13 wherein the unwrapper equipment being mounted for movement from a first position blocking movement of said rectangular module toward the disperser to a second position allowing movement of the rectangular module toward the disperser, and further comprising moving the unwrapper equipment out of the first position to the second position and then conveying rectangular modules into the open front of the disperser.

15. The method of claim 10 wherein said wrapped seed cotton module has a circular cross section transverse to the direction of travel of said conveyor.

16. The method of claim 15 wherein the unwrapper equipment being mounted for movement from a first position blocking movement of said circular module toward the disperser to a second position allowing movement of the rectangular module toward the disperser, and further comprising moving the unwrapper equipment out of the first position to the second position and then conveying rectangular modules into the open front of the disperser.

17. The method of claim 10 wherein the unwrapping equipment includes a device for picking the module up off said conveyor elements and a mechanism for rotating the module when it is off the underlying surface.

18. The module feeder of claim 10 wherein said panels extend above the conveyor to at least half way between the uppermost and lowermost disperser drums.

19. A cotton gin comprising
at least one gin stand,
a disperser having a vertically extending open front defined by a top wall and side walls and a series of disperser drums therein extending between the side walls, said disperser drums comprising a topmost drum, a bottom most drum and at least one intermediate drum vertically spaced in said disperser so as to reduce the contents of a seed cotton module to clumps for delivering the clumps to the gin stand,
a conveyor having opposite ends and conveyor elements overriding a stationary base and extending horizontally from said open front below said bottom drum whereby said conveyor is adapted to convey seed cotton modules into the open front of the disperser,
unwrapper equipment intermediate the ends of the conveyor for assisting in unwrapping wrapped seed cotton modules and having a downstream end upstream of the disperser open front, and
a panel disposed at a fixed location on each side of the conveyor extending in a conveying direction of travel of the conveyor from adjacent the disperser open front to at least the downstream end of the equipment and extending upwardly from a first location no higher than said conveyor elements of the conveyor to a second location above the conveyor to at least a predetermined height above the lowermost intermediate disperser drum to prevent material in the module from escaping off a side of the conveyor between the unwrapping equipment and the disperser.

20. A method of operating a cotton gin having
at least one cotton gin stand for delivering seed cotton clumps to a cotton gin stand,
said module feeder comprising a disperser having a vertically extending open front defined by a top wall and side walls and a series of disperser drums therein extending between the side walls, said disperser drums comprising a topmost drum, a bottom most drum and at least one intermediate drum vertically spaced in said disperser so as to reduce the contents of a seed cotton module to clumps for delivering the clumps to the gin stand,
a conveyor having opposite ends and conveyor elements overriding a stationary base and extending horizontally from said open front below said bottom drum whereby said conveyor is adapted to convey seed cotton modules into the open front of the disperser,
unwrapper equipment intermediate the ends of the conveyor for assisting in unwrapping wrapped seed cotton modules and having a downstream end upstream of the disperser open front, and
a panel disposed at a fixed location on each side of the conveyor extending in a conveying direction of travel of the conveyor from adjacent the disperser open front to at least the downstream end of the equipment and extending upwardly from a first location no higher than said conveyor elements of the conveyor to a second location above the conveyor to at least a predetermined height above the lowermost intermediate disperser drum to prevent material in the module from escaping off a side of the conveyor between the unwrapping equipment and the disperser;
said method comprising
positioning wrapped seed cotton modules on the conveyor upstream of the unwrapping equipment;
horizontally conveying the wrapped seed cotton modules on the conveyor to the unwrapper equipment;
unwrapping each seed cotton module at the unwrapper equipment;
preventing seed cotton material from each unwrapped module from escaping off a side of the conveyor between the unwrapping equipment and the disperser via each side panel; and
horizontally conveying each unwrapped module on the conveyor into the disperser for producing clumps of seed cotton.

21. A module feeder for delivering seed cotton clumps to a cotton gin stand comprising
a disperser having a vertically extending open front defined by a top wall and side walls and a series of disperser drums therein extending between the side walls, said disperser drums comprising a topmost drum, a bottom most drum and at least one intermediate drum vertically spaced in said disperser so as to reduce the contents of a seed cotton module to clumps for deliv-ering the clumps to the gin stand,
a conveyor having opposite ends and conveyor elements overriding a stationary base and extending horizontally from said open front below said bottom drum whereby said conveyor is adapted to convey seed cotton modules into the open front of the disperser,
unwrapper equipment intermediate the ends of the conveyor for assisting in unwrapping wrapped seed cotton round modules and having a downstream end upstream of the disperser open front, and
a panel, disposed at a fixed location on each side of the conveyor when the conveyor conveys an unwrapped seed cotton module toward the disperser, extending in a conveying direction of travel of the conveyor from adjacent the disperser open front to at least the downstream end of the equipment and extending upwardly from a first location no higher than said conveyor elements of the conveyor to a second location position above the conveyor to at least a predetermined height above the lowermost intermediate disperser drum to prevent material in the module from escaping off a side of the conveyor between the unwrapping equipment and the disperser.

* * * * *